US012683653B2

(12) United States Patent
Kang et al.

(10) Patent No.: US 12,683,653 B2
(45) Date of Patent: Jul. 14, 2026

(54) METHOD AND DEVICE FOR PERFORMING UPLINK TRANSMISSION/RECEPTION IN WIRELESS COMMUNICATION SYSTEM

(71) Applicant: LG Electronics Inc., Seoul (KR)

(72) Inventors: Jiwon Kang, Seoul (KR); Hyungtae Kim, Seoul (KR); Kyuseok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 281 days.

(21) Appl. No.: 18/692,650

(22) PCT Filed: Oct. 7, 2022

(86) PCT No.: PCT/KR2022/015118
§ 371 (c)(1),
(2) Date: Mar. 15, 2024

(87) PCT Pub. No.: WO2023/059128
PCT Pub. Date: Apr. 13, 2023

(65) Prior Publication Data
US 2025/0141499 A1     May 1, 2025

(30) Foreign Application Priority Data

Oct. 8, 2021     (KR) ........................ 10-2021-0134072

(51) Int. Cl.
*H04B 7/0404* (2017.01)
*H04L 1/08* (2006.01)
(Continued)

(52) U.S. Cl.
CPC ............. *H04B 7/0404* (2013.01); *H04L 1/08* (2013.01); *H04L 5/0048* (2013.01); *H04W 72/1268* (2013.01); *H04W 72/232* (2023.01)

(58) Field of Classification Search
CPC .. H04B 7/0404; H04B 7/0456; H04B 7/0617; H04B 7/0626; H04B 7/0632;
(Continued)

(56) References Cited

U.S. PATENT DOCUMENTS

2022/0303097 A1* 9/2022 Zhang ........................ H04L 1/08
2025/0113361 A1* 4/2025 Kim .......................... H04L 1/08
(Continued)

FOREIGN PATENT DOCUMENTS

EP          3697014 A1     8/2020
EP          4478643 A1     12/2024
(Continued)

OTHER PUBLICATIONS

CATT, "On multi-TRP/panel for PDCCH, PUCCH and PUSCH," 3GPP TSG RAN WG1 #106bis-e, R1-2109185, e-Meeting, Oct. 11-19, 2021, 12 pages.
(Continued)

*Primary Examiner* — Nimesh Patel
(74) *Attorney, Agent, or Firm* — Fish & Richardson P.C.

(57) ABSTRACT

A method and a device for performing uplink transmission/reception in a wireless communication system are disclosed. A method by which a terminal performs uplink transmission in a wireless communication system, according to an embodiment of the present disclosure, may comprise the steps of: receiving, from a base station, configuration information about one or more sets of SRS resources; receiving, from the base station, DCI for scheduling a PUSCH, the DCI including information related to one or more sets of SRS resources from among the one or more sets of SRS resources; identifying a method to be applied to the PUSCH from among a first method and a second method; and transmitting the PUSCH to the base station on the basis of the identified method.

12 Claims, 11 Drawing Sheets

(51) Int. Cl.
| | |
|---|---|
| *H04L 5/00* | (2006.01) |
| *H04W 72/1268* | (2023.01) |
| *H04W 72/232* | (2023.01) |

(58) Field of Classification Search

CPC .. H04B 7/0413; H04B 7/0452; H04B 17/373; H04B 7/06968; H04B 17/309; H04B 7/022; H04B 7/06952; H04B 7/0408; H04B 17/318; H04B 7/06964; H04B 7/0697; H04B 7/088; H04B 1/713; H04B 7/06956; H04B 17/328; H04B 7/02; H04B 7/06954; H04L 1/08; H04L 5/0048; H04L 5/0023; H04L 5/0094; H04L 5/0051; H04L 5/0053; H04L 5/0044; H04L 5/001; H04L 5/0007; H04L 5/0055; H04L 5/0098; H04L 27/2613; H04L 1/1861; H04L 25/0226; H04L 5/00; H04L 5/1469; H04L 2025/03414; H04L 1/1854; H04L 1/0026; H04L 1/1822; H04L 1/1887; H04L 27/2666; H04L 5/0035; H04L 5/0005; H04L 1/0023; H04L 5/0041; H04L 1/06; H04L 5/0016; H04L 5/0057; H04L 5/0078; H04L 1/18; H04L 1/189; H04L 5/0012; H04L 5/023; H04L 1/1893; H04L 1/0031; H04L 25/0204; H04W 72/1268; H04W 72/232; H04W 72/04; H04W 72/12; H04W 72/23; H04W 72/0446; H04W 72/0453; H04W 72/21; H04W 72/231; H04W 74/006; H04W 74/004; H04W 48/12; H04W 52/42; H04W 72/046; H04W 16/14; H04W 16/28; H04W 72/044; H04W 74/0808; H04W 72/51; H04W 72/52; H04W 74/002; H04W 72/0473; H04W 72/40; H04W 84/042; H04W 56/0005; H04W 72/25; H04W 74/02; H04W 76/19; H04W 28/20; H04W 36/0055; H04W 36/08; H04W 74/00; H04W 72/56; H04W 72/541; H04W 72/30; H04W 92/02; Y02D 30/70; G06N 3/08; G06N 3/09; G06N 3/045; G06N 3/006; G06N 3/02; G06N 3/0464; G06N 20/00; G06N 7/01; H04J 11/00; H04J 3/1694

See application file for complete search history.

(56) References Cited

U.S. PATENT DOCUMENTS

| | | | | |
|---|---|---|---|---|
| 2025/0141499 A1* | 5/2025 | Kang | .................... | H04W 72/12 |
| 2025/0317251 A1* | 10/2025 | Kim | .................... | H04L 5/0094 |

FOREIGN PATENT DOCUMENTS

| | | |
|---|---|---|
| EP | 4568156 A1 | 6/2025 |
| WO | WO 2020/165413 | 8/2020 |

OTHER PUBLICATIONS

International Search Report and Written Opinion in Appln. No. PCT/KR2022/015118, mailed on Jan. 25, 2023, 6 pages (with English translation).

NTT Docomo, Inc, "Discussion on SRS enhancement," 3GPP TSG RAN WG1 #106b-e, R1-2109663, e-Meeting, Oct. 11-19, 2021, 13 pages.

OPPO, "Enhancements on multi-TRP for PDCCH, PUCCH and PUSCH," 3GPP TSG RAN WG1 #106bis-e, R1-2109039, e-Meeting, Oct. 11-19, 2021, 9 pages.

Vivo, "Further discussion on Multi-TRP for PDCCH, PUCCH and PUSCH enhancements," 3GPP TSG RAN WG1 #106bis-e, R1-2108952, e-Meeting, Oct. 11-19, 2021, 21 pages.

Extended European Search Report in European Appln. No. 22878949.1, mailed on Sep. 29, 2025, 10 pages.

* cited by examiner

METHOD AND DEVICE FOR PERFORMING UPLINK TRANSMISSION/RECEPTION IN WIRELESS COMMUNICATION SYSTEM

CROSS-REFERENCE TO RELATED APPLICATIONS

This application is a National Stage application under 35 U.S.C. § 371 of International Application No. PCT/KR2022/015118, filed on Oct. 7, 2022, which claims the benefit of Korean Application No. 10-2021-0134072, filed on Oct. 8, 2021. The disclosures of the prior applications are incorporated by reference in their entirety.

TECHNICAL FIELD

The present disclosure relates to a wireless communication system, and more particularly, to a method and apparatus for transmitting and receiving channel state information in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and apparatus for performing uplink transmission and reception in a wireless communication system.

In addition, an additional technical object of the present disclosure is to provide a method and apparatus for configuring/indicating multiple panels-based simultaneous transmission in transmission and reception of a physical uplink shared channel (PUSCH).

The technical objects to be achieved by the present disclosure are not limited to the above-described technical objects, and other technical objects which are not described herein will be clearly understood by those skilled in the pertinent art from the following description.

A method for performing uplink transmission by a user equipment (UE) in a wireless communication system according to an aspect of the present disclosure may comprise: receiving, from a base station, configuration information for one or more sounding reference signal (SRS) resource sets; receiving, from the base station, downlink control information (DCI) for scheduling a physical uplink shared channel (PUSCH), the DCI including information related to at least one SRS resource set among the one or more SRS resource sets; based on at least one of a number of at least one SRS resource set or information related to one of a first scheme or a second scheme for multi-spatial parameter based simultaneous transmission, identifying a scheme to be applied to the PUSCH from among the first scheme or the second scheme; and transmitting the PUSCH to the base station based on the identified scheme. Here, the first scheme may correspond to the same layer based transmission scheme, and the second scheme corresponds to a different layer based transmission scheme.

A method for performing uplink reception by a base station in a wireless communication system according to an additional aspect of the present disclosure may comprise: transmitting, to a user equipment (UE), configuration information for one or more sounding reference signal (SRS) resource sets; transmitting, to the UE, downlink control information (DCI) for scheduling a physical uplink shared channel (PUSCH), the DCI including information related to at least one SRS resource set among the one or more SRS resource sets; and receiving, from the UE, a PUSCH based on a first scheme or a second scheme for multi-spatial parameter based simultaneous transmission. Here, one of the first scheme or the second scheme applied to the PUSCH may be indicated based on at least one of a number of the at least one SRS resource set or information related to one of the first scheme or the second scheme. Additionally, the first scheme may correspond to the same layer based transmission scheme, and the second scheme corresponds to a different layer based transmission scheme.

According to an embodiment of the present disclosure, a method and apparatus for performing uplink transmission and reception in a wireless communication system may be provided.

In addition, according to an embodiment of the present disclosure, a method and apparatus for configuring/indicating multiple panels-based simultaneous transmission in transmission and reception of a physical uplink shared channel (PUSCH) may be provided.

In addition, according to an embodiment of the present disclosure, for PUSCH transmission, there is an advantage of efficiently switching and operating multiple schemes for simultaneous transmission based on multiple panels.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
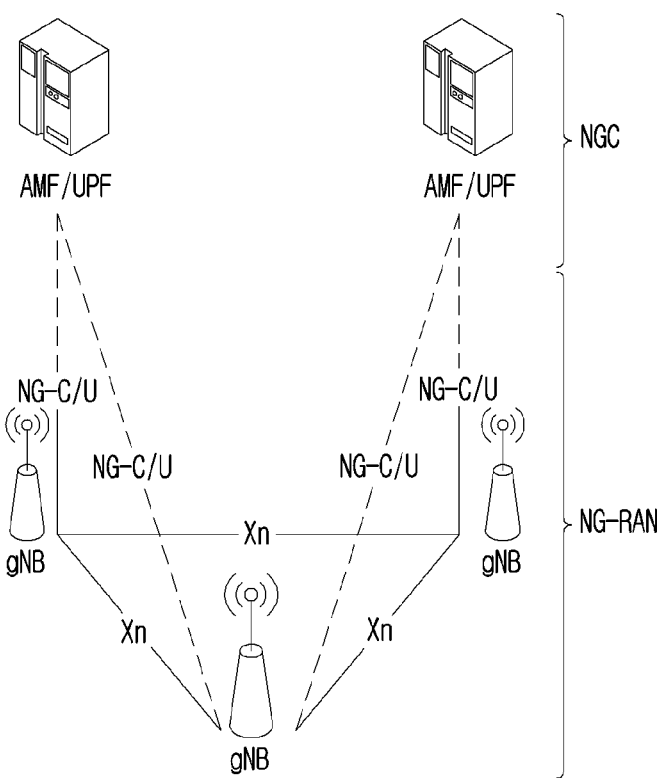
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro. To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as Follows.

BM: beam management

CQI: Channel Quality Indicator

CRI: channel state information-reference signal resource indicator

CSI: channel state information

CSI-IM: channel state information-interference measurement

CSI-RS: channel state information-reference signal

DMRS: demodulation reference signal

FDM: frequency division multiplexing

FFT: fast Fourier transform

IFDMA: interleaved frequency division multiple access

IFFT: inverse fast Fourier transform

L1-RSRP: Layer 1 reference signal received power

L1-RSRQ: Layer 1 reference signal received quality

MAC: medium access control

NZP: non-zero power

OFDM: orthogonal frequency division multiplexing

PDCCH: physical downlink control channel

PDSCH: physical downlink shared channel

PMI: precoding matrix indicator

RE: resource element

RI: Rank indicator

RRC: radio resource control

RSSI: received signal strength indicator

Rx: Reception

QCL: quasi co-location

SINR: signal to interference and noise ratio

SSB (or SS/PBCH block): Synchronization signal block (including PSS (primary synchronization signal), SSS (secondary synchronization signal) and PBCH (physical broadcast channel))

TDM: time division multiplexing

TRP: transmission and reception point

TRS: tracking reference signal

Tx: transmission

UE: user equipment

ZP: zero power

Overall System

As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
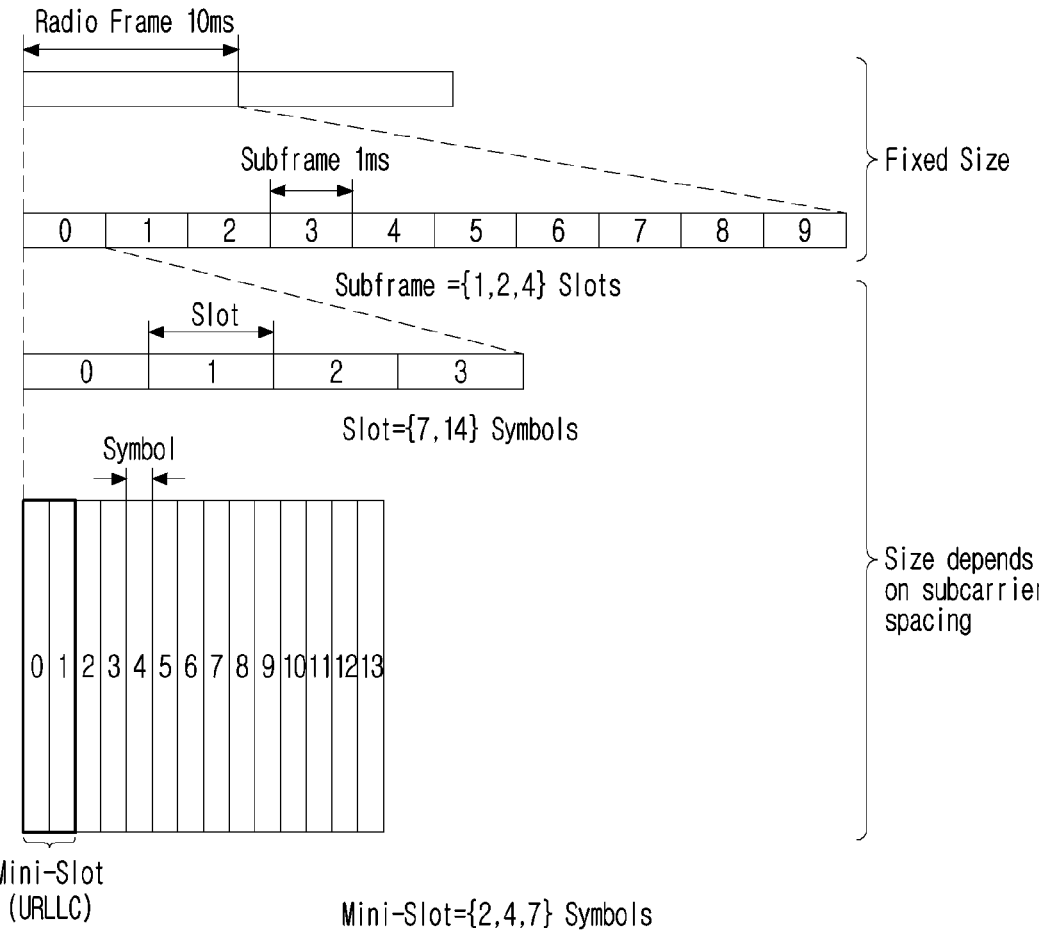
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, u). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| $\mu$ | $\Delta f = 2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max} N_f/100) \cdot T_c = 10$ ms. Here, a radio frame is configured with 10 subframes having a duration of $T_{sf}=(\Delta f_{max} N_f/1000) \cdot T_c = 1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration $\mu$, slots are numbered in an increasing order of $n_s^{\mu} \in \{0, \ldots, N_{slot}^{subframe,\mu}-1\}$ in a subframe and are numbered in an increasing order of $n_{s,f}^{\mu} \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^{\mu}$ in a subframe is temporally arranged with a start of an OFDM symbol $n_s^{\mu} N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |

TABLE 3-continued

| $\mu$ | $N_{symb}^{slot}$ | $N_{slot}^{frame, \mu}$ | $N_{slot}^{subframe, \mu}$ |
|---|---|---|---|
| 3 | 14 | 80 | 8 |
| 4 | 14 | 160 | 16 |

TABLE 4

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 2 is an example on $\mu=2$ (SCS is 60 kHz), 1 subframe may include 4 slots referring to Table 3. 1 subframe=$\{1,2,4\}$ slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
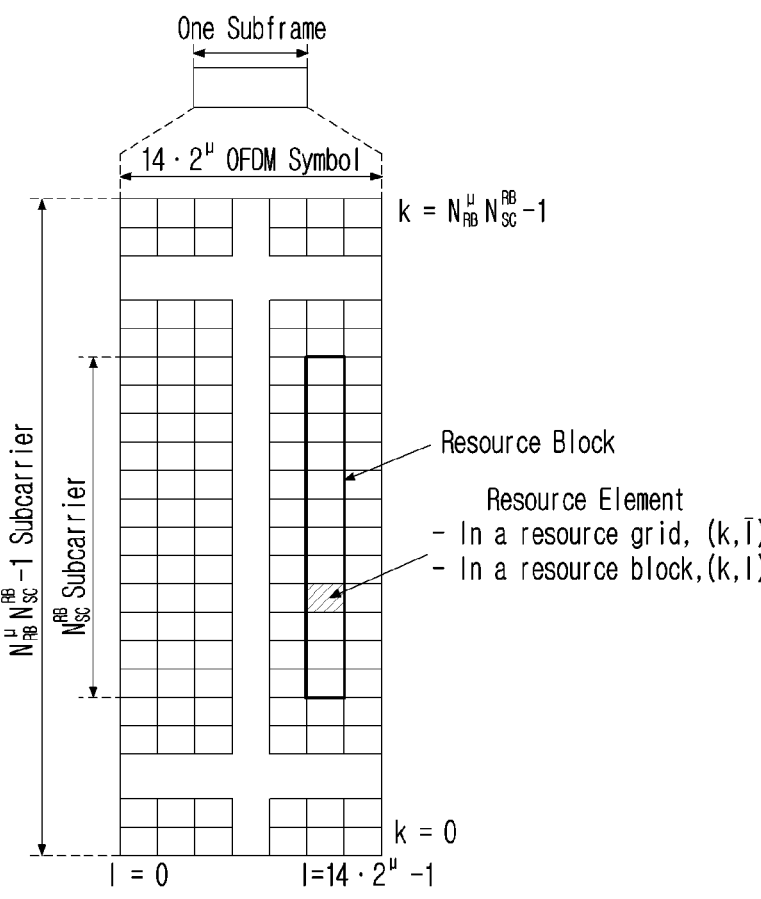
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^{\mu} N_{sc}^{RB}$ subcarriers in a frequency domain and one subframe is configured with $14 \cdot 2^{\mu}$ OFDM symbols, but it is not limited thereto. In an NR system, a transmitted signal is described by OFDM symbols of $2^{\mu} N_{symb}^{(\mu)}$ and one or more resource grids configured with $N_{RB}^{\mu} N_{sc}^{RB}$ subcarriers. Here, $N_{RB}^{\mu} \leq N_{RB}^{max,\mu}$. The $N_{RB}^{max,\mu}$ represents a maximum transmission bandwidth, which may be different between an uplink and a downlink as well as between numerologies. In this case, one resource grid may be configured per u and antenna port p. Each element of a resource grid for u and an antenna port p is referred to as a resource element and is uniquely identified by an index pair (k,l'). Here, $k=0, \ldots, N_{RB}^{\mu} N_{sc}^{RB}-1$ is an index in a frequency domain and $l'=0, \ldots, 2^{\mu} N_{symb}^{(\mu)}-1$ refers to a position of a symbol in a subframe. When referring to a resource element in a slot, an index pair (k,l) is used. Here, $l=0, \ldots, N_{symb}^{\mu}-1$. A resource element (k,l') for u and an antenna port p corresponds to a complex value, $a_{k,l'}^{(p,\mu)}$. When there is no risk of confusion or when a specific antenna port or numerology is not specified, indexes p and $\mu$ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration $\mu$. The center of subcarrier 0 of common resource block 0 for a subcarrier spacing configuration $\mu$ is identical to 'point A'. A relationship between a common resource block number $n_{CRB}^{\mu}$ and a resource element (k,l) for a subcarrier spacing configuration $\mu$ in a frequency domain is given as in the following Equation 1.

$$n_{CRB}^{\mu} = \left\lfloor \frac{k}{N_{sc}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \qquad \text{[Equation 2]}$$

$N_{BWP,i}^{start,\mu}$ is a common resource block that a BWP starts relatively to common resource block 0.

Figure 4:
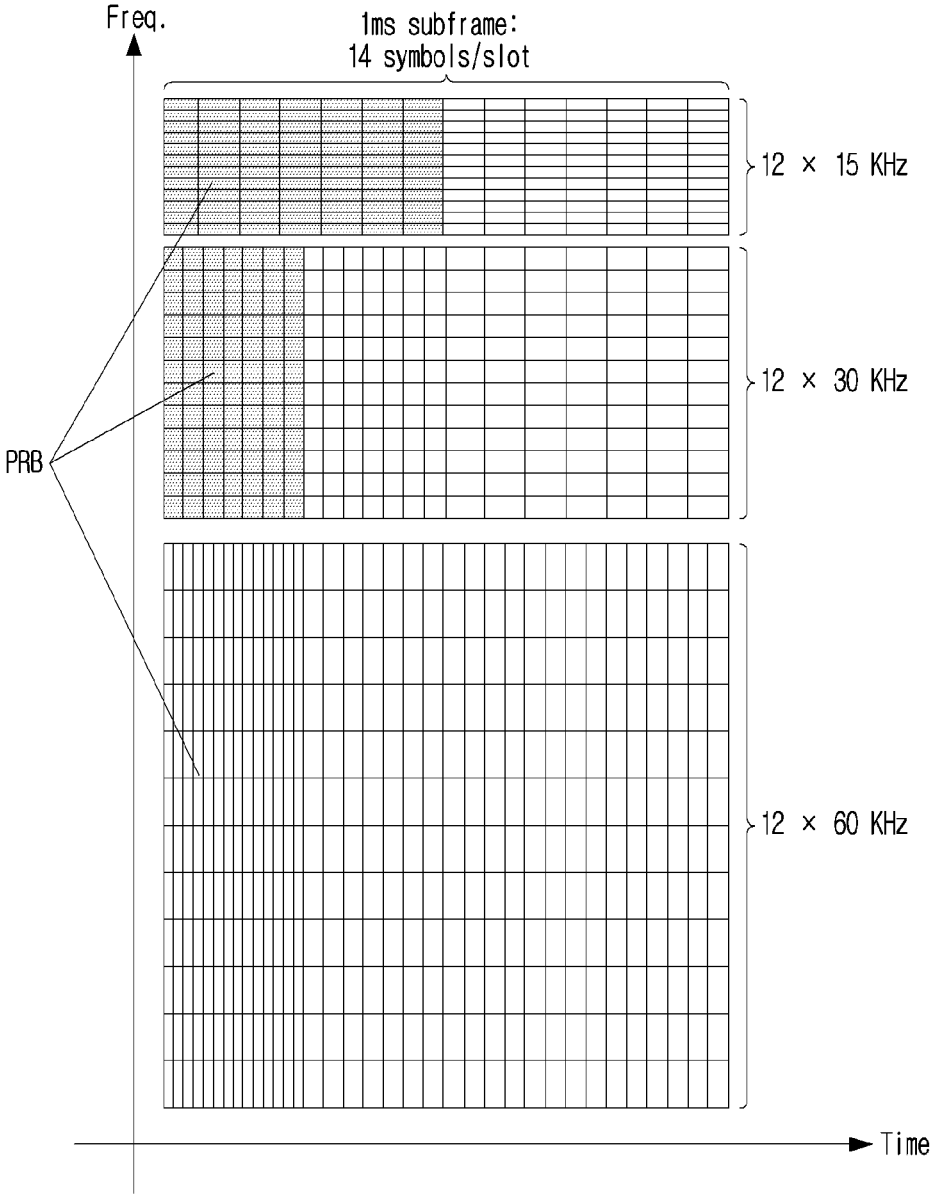
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
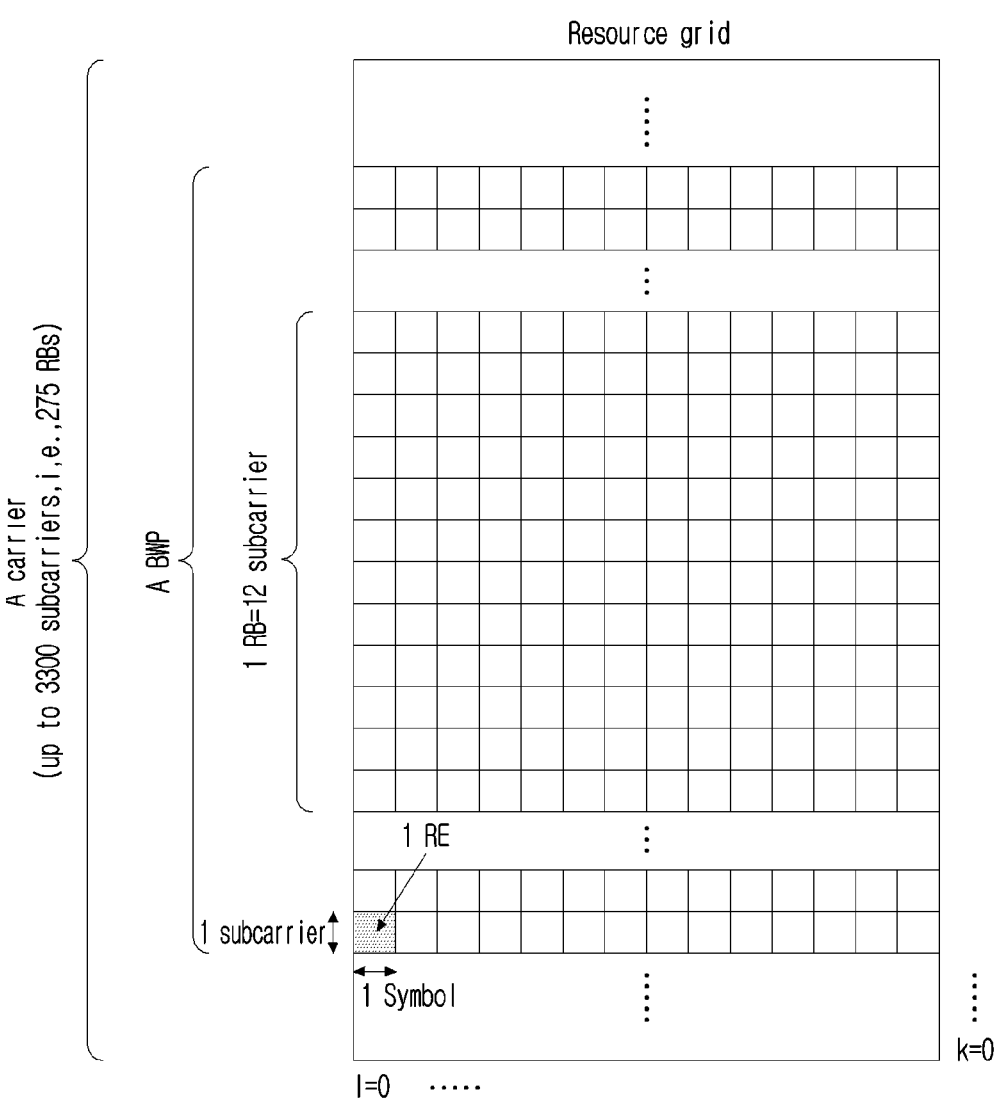
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth.

By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
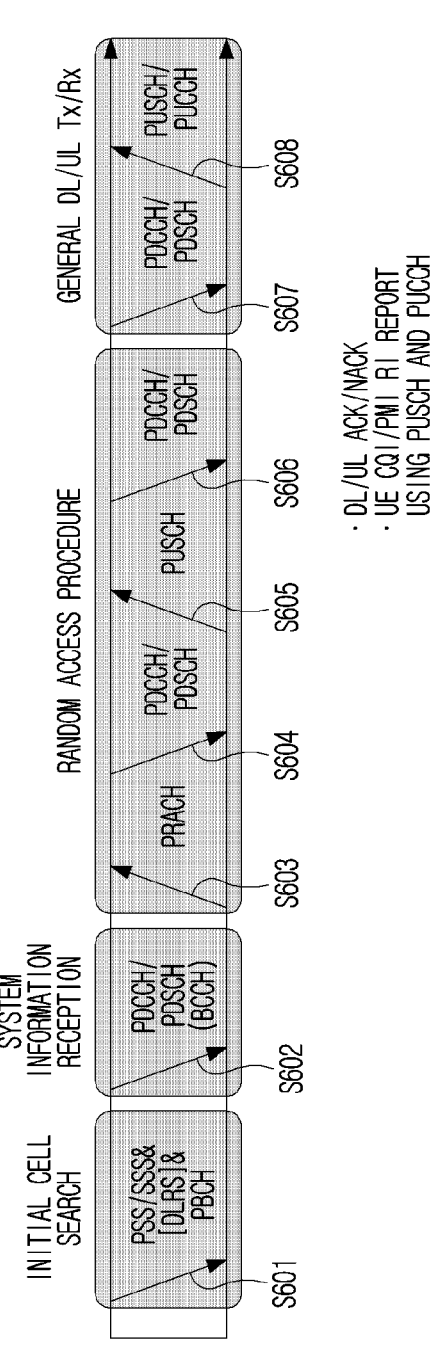
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/ PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

CSI-related Operation

In an NR (New Radio) system, a CSI-RS (channel state information-reference signal) is used for time and/or frequency tracking, CSI computation, L1 (layer 1)-RSRP (reference signal received power) computation and mobility. Here, CSI computation is related to CSI acquisition and L1-RSRP computation is related to beam management (BM).

CSI (channel state information) collectively refers to information which may represent quality of a radio channel (or also referred to as a link) formed between a terminal and an antenna port.

To perform one of the usages of a CSI-RS, a terminal (e.g., user equipment, UE) receives configuration information related to CSI from a base station (e.g., general Node B, gNB) through RRC (radio resource control) signaling.

The configuration information related to CSI may include at least one of information related to a CSI-IM (interference management) resource, information related to CSI measurement configuration, information related to CSI resource configuration, information related to a CSI-RS resource or information related to CSI report configuration.

i) Information related to a CSI-IM resource may include CSI-IM resource information, CSI-IM resource set information, etc. A CSI-IM resource set is identified by a CSI-IM resource set ID (identifier) and one resource set includes at least one CSI-IM resource. Each CSI-IM resource is identified by a CSI-IM resource ID.

ii) Information related to CSI resource configuration may be expressed as CSI-ResourceConfig IE. Information related to a CSI resource configuration defines a group which includes at least one of an NZP (non zero power) CSI-RS resource set, a CSI-IM resource set or a CSI-SSB resource set. In other words, the information related to a CSI resource configuration may include a CSI-RS resource set list and the CSI-RS resource set list may include at least one of a NZP CSI-RS resource set list, a CSI-IM resource set list or a CSI-SSB resource set list. A CSI-RS resource set is identified by a CSI-RS resource set ID and one resource set includes at least one CSI-RS resource. Each CSI-RS resource is identified by a CSI-RS resource ID.

Parameters representing a usage of a CSI-RS (e.g., a 'repetition' parameter related to BM, a 'trs-Info' parameter related to tracking) may be configured per NZP CSI-RS resource set.

iii) Information related to a CSI report configuration includes a report configuration type (reportConfigType) parameter representing a time domain behavior and a report quantity (reportQuantity) parameter representing CSI-related quantity for a report. The time domain behavior may be periodic, aperiodic or semi-persistent.

A terminal measures CSI based on the configuration information related to CSI.

The CSI measurement may include (1) a process in which a terminal receives a CSI-RS and (2) a process in which CSI is computed through a received CSI-RS and detailed description thereon is described after.

For a CSI-RS, RE (resource element) mapping of a CSI-RS resource in a time and frequency domain is configured by higher layer parameter CSI-RS-ResourceMapping.

A terminal reports the measured CSI to a base station.

In this case, when quantity of CSI-ReportConfig is configured as 'none (or No report)', the terminal may omit the report. But, although the quantity is configured as 'none (or No report)', the terminal may perform a report to a base station. When the quantity is configured as 'none', an aperiodic TRS is triggered or repetition is configured. In this case, only when repetition is configured as 'ON', a report of the terminal may be omitted.

CSI Measurement

An NR system supports more flexible and dynamic CSI measurement and reporting. Here, the CSI measurement may include a procedure of receiving a CSI-RS and acquiring CSI by computing a received CSI-RS.

As a time domain behavior of CSI measurement and reporting, aperiodic/semi-persistent/periodic CM (channel measurement) and IM (interference measurement) are supported. 4-port NZP CSI-RS RE pattern is used for CSI-IM configuration.

CSI-IM based IMR of NR has a design similar to CSI-IM of LTE and is configured independently from ZP CSI-RS resources for PDSCH rate matching. In addition, each port emulates an interference layer having (a desirable channel and) a precoded NZP CSI-RS in NZP CSI-RS-based IMR. As it is about intra-cell interference measurement for a multi-user case, MU interference is mainly targeted.

A base station transmits a precoded NZP CSI-RS to a terminal in each port of configured NZP CSI-RS based IMR.

A terminal assumes a channel/interference layer and measures interference for each port in a resource set.

When there is no PMI and RI feedback for a channel, a plurality of resources are configured in a set and a base station or a network indicates a subset of NZP CSI-RS resources through DCI for channel/interference measurement.

A resource setting and a resource setting configuration are described in more detail.

Resource Setting

Each CSI resource setting 'CSI-ResourceConfig' includes a configuration for a S≥1 CSI resource set (given by a higher layer parameter csi-RS-ResourceSetList). A CSI resource setting corresponds to CSI-RS-resourcesetlist. Here, S represents the number of configured CSI-RS resource sets.

Here, a configuration for a S≥1 CSI resource set includes each CSI resource set including CSI-RS resources (configured with a NZP CSI-RS or CSI-IM) and a SS/PBCH block (SSB) resource used for L1-RSRP computation.

Each CSI resource setting is positioned at a DL BWP (bandwidth part) identified by a higher layer parameter bwp-id. In addition, all CSI resource settings linked to a CSI reporting setting have the same DL BWP.

A time domain behavior of a CSI-RS resource in a CSI resource setting included in a CSI-ResourceConfig IE may be indicated by a higher layer parameter resourceType and may be configured to be aperiodic, periodic or semi-persistent. For a periodic and semi-persistent CSI resource setting, the number(S) of configured CSI-RS resource sets is limited to '1'. For a periodic and semi-persistent CSI resource setting, configured periodicity and a slot offset are given by a numerology of an associated DL BWP as given by bwp-id.

When UE is configured with a plurality of CSI-ResourceConfigs including the same NZP CSI-RS resource ID, the same time domain behavior is configured for CSI-ResourceConfig.

When UE is configured with a plurality of CSI-ResourceConfigs including the same CSI-IM resource ID, the same time domain behavior is configured for CSI-ResourceConfig.

One or more CSI resource settings for channel measurement (CM) and interference measurement (IM) are configured through higher layer signaling as follows.

CSI-IM resource for interference measurement

NZP CSI-RS resource for interference measurement

NZP CSI-RS resource for channel measurement

In other words, a CMR (channel measurement resource) may be a NZP CSI-RS for CSI acquisition and an IMR (Interference measurement resource) may be a NZP CSI-RS for CSI-IM and IM.

In this case, CSI-IM (or a ZP CSI-RS for IM) is mainly used for inter-cell interference measurement.

In addition, an NZP CSI-RS for IM is mainly used for intra-cell interference measurement from multi-users.

UE may assume that CSI-RS resource(s) for channel measurement and CSI-IM/NZP CSI-RS resource(s) for interference measurement configured for one CSI reporting are 'QCL-TypeD' per resource.

Resource Setting Configuration

As described, a resource setting may mean a resource set list.

For aperiodic CSI, each trigger state configured by using a higher layer parameter CSI-AperiodicTriggerState is associated with one or a plurality of CSI-ReportConfigs that each CSI-ReportConfig is linked to a periodic, semi-persistent or aperiodic resource setting.

One reporting setting may be connected to up to 3 resource settings.

When one resource setting is configured, a resource setting (given by a higher layer parameter resourcesForChannelMeasurement) is about channel measurement for L1-RSRP computation.

When two resource settings are configured, a first resource setting (given by a higher layer parameter resourcesForChannelMeasurement) is for channel measurement and a second resource setting (given by csi-IM-ResourcesForInterference or nzp-CSI-RS-ResourcesForInterference) is for interference measurement performed in CSI-IM or a NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement and a third resource setting (given by nzp-CSI-RS-ResourcesForInterference) is for NZP CSI-RS based interference measurement.

For semi-persistent or periodic CSI, each CSI-ReportConfig is linked to a periodic or semi-persistent resource setting.

When one resource setting (given by resourcesForChannelMeasurement) is configured, the resource setting is about channel measurement for L1-RSRP computation.

When two resource settings are configured, a first resource setting (given by resourcesForChannelMeasurement) is for channel measurement and a second resource setting (given by a higher layer parameter csi-IM-ResourcesForInterference) is used for interference measurement performed in CSI-IM.

CSI Computation

When interference measurement is performed in CSI-IM, each CSI-RS resource for channel measurement is associated with a CSI-IM resource per resource in an order of CSI-RS resources and CSI-IM resources in a corresponding resource set. The number of CSI-RS resources for channel measurement is the same as the number of CSI-IM resources.

In addition, when interference measurement is performed in an NZP CSI-RS, UE does not expect to be configured with one or more NZP CSI-RS resources in an associated resource set in a resource setting for channel measurement.

A terminal configured with a higher layer parameter nzp-CSI-RS-ResourcesForInterference does not expect that 18 or more NZP CSI-RS ports will be configured in a NZP CSI-RS resource set.

For CSI measurement, a terminal assumes the followings.

Each NZP CSI-RS port configured for interference measurement corresponds to an interference transmission layer.

All interference transmission layers of an NZP CSI-RS port for interference measurement consider EPRE (energy per resource element) ratio.

A different interference signal in RE(s) of an NZP CSI-RS resource for channel measurement, an NZP CSI-RS resource for interference measurement or a CSI-IM resource for interference measurement CSI Report For a CSI report, a time and frequency resource which may be used by UE are controlled by a base station.

CSI (channel state information) may include at least one of a channel quality indicator (CQI), a precoding matrix indicator (PMI), a CSI-RS resource indicator (CRI), a SS/PBCH block resource indicator (SSBRI), a layer indicator (LI), a rank indicator (RI) or L1-RSRP.

For CQI, PMI, CRI, SSBRI, LI, RI, L1-RSRP, a terminal is configured by a higher layer with N≥1 CSI-ReportConfig reporting setting, M≥1 CSI-ResourceConfig resource setting and a list of one or two trigger states (provided by aperiodicTriggerStateList and semiPersistentOnPUSCH-TriggerStateList). Each trigger state in the aperiodicTriggerStateList includes a associated CSI-ReportConfigs list which indicates a channel and optional resource set IDs for interference. In semiPersistentOnPUSCH-TriggerStateList, one associated CSI-ReportConfig is included in each trigger state.

In addition, a time domain behavior of CSI reporting supports periodic, semi-persistent, aperiodic.

i) Periodic CSI reporting is performed in a short PUCCH, a long PUCCH. Periodicity and a slot offset of periodic CSI reporting may be configured by RRC and refers to a CSI-ReportConfig IE.

ii) SP (semi-periodic) CSI reporting is performed in a short PUCCH, a long PUCCH, or a PUSCH.

For SP CSI in a short/long PUCCH, periodicity and a slot offset are configured by RRC and a CSI report is activated/deactivated by separate MAC CE/DCI.

For SP CSI in a PUSCH, periodicity of SP CSI reporting is configured by RRC, but a slot offset is not configured by RRC and SP CSI reporting is activated/deactivated by DCI (format 0_1). For SP CSI reporting in a PUSCH, a separated RNTI (SP-CSI C-RNTI) is used.

An initial CSI report timing follows a PUSCH time domain allocation value indicated by DCI and a subsequent CSI report timing follows a periodicity configured by RRC.

DCI format 0_1 may include a CSI request field and activate/deactivate a specific configured SP-CSI trigger state. SP CSI reporting has activation/deactivation equal or similar to a mechanism having data transmission in a SPS PUSCH.

iii) Aperiodic CSI reporting is performed in a PUSCH and is triggered by DCI. In this case, information related to trigger of aperiodic CSI reporting may be delivered/indicated/configured through MAC-CE.

For AP CSI having an AP CSI-RS, AP CSI-RS timing is configured by RRC and timing for AP CSI reporting is dynamically controlled by DCI.

In NR, a method of dividing and reporting CSI in a plurality of reporting instances applied to a PUCCH based CSI report in LTE (e.g., transmitted in an order of RI, WB PMI/CQI, SB PMI/CQI) is not applied. Instead, in NR, there is a limit that a specific CSI report is not configured in a short/long PUCCH and a CSI omission rule is defined. In addition, regarding AP CSI reporting timing, a PUSCH symbol/slot location is dynamically indicated by DCI. In addition, candidate slot offsets are configured by RRC. For CSI reporting, a slot offset (Y) is configured per reporting setting. For UL-SCH, a slot offset K2 is separately configured.

2 CSI latency classes (low latency class, high latency class) are defined with regard to CSI computation complexity. Low latency CSI is WB CSI which includes up to 4 ports Type-I codebooks or up to 4 ports non-PMI feedback CSI. High latency CSI refers to CSI other than low latency CSI. For a normal terminal, (Z, Z') is defined in a unit of OFDM symbols. Here, Z represents the minimum CSI processing time until a CSI report is performed after receiving aperiodic CSI triggering DCI. In addition, Z' refers to the minimum CSI processing time until a CSI report is performed after receiving a CSI-RS for a channel/interference.

Additionally, a terminal reports the number of CSI which may be calculated at the same time.

Quasi-co Location (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS (demodulation reference signal) of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A QCL type corresponding to each DL RS is given by a higher layer parameter qcl-Type of QCL-Info and may take one of the following values.

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

For example, when a target antenna port is a specific NZP CSI-RS, it may be indicated/configured that a corresponding NZP CSI-RS antenna port is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

When HARQ-ACK corresponding to a PDSCH carrying an activation command is transmitted in a slot n, mapping indicated between a TCI state and a codepoint of a DCI field 'Transmission Configuration Indication' may be applied by starting from a slot $n+3N_{slot}^{subframe,\mu}+1$. After UE receives an initial higher layer configuration for TCI states before receiving an activation command, UE may assume for QCL-TypeA, and if applicable, for QCL-TypeD that a DMRS port of a PDSCH of a serving cell is quasi-colocated with a SS/PBCH block determined in an initial access process.

When a higher layer parameter (e.g., tci-PresentInDCI) indicating whether there is a TCI field in DCI configured for UE is set to be enabled for a CORESET scheduling a PDSCH, UE may assume that there is a TCI field in DCI format 1_1 of a PDCCH transmitted in a corresponding CORESET. When tci-PresentInDCI is not configured for a CORESET scheduling a PDSCH or when a PDSCH is scheduled by DCI format 1_0 and a time offset between reception of DL DCI and a corresponding PDSCH is equal to or greater than a predetermined threshold (e.g., timeDurationForQCL), in order to determine a PDSCH antenna port QCL, UE may assume that a TCI state or a QCL assumption for a PDSCH is the same as a TCI state or a QCL assumption applied to a CORESET used for PDCCH transmission. Here, the predetermined threshold may be based on reported UE capability.

When a parameter tci-PresentInDCI is set to be enabled, a TCI field in DCI in a scheduling CC (component carrier) may indicate an activated TCI state of a scheduled CC or a DL BWP. When a PDSCH is scheduled by DCI format 1_1, UE may use a TCI-state according to a value of a 'Transmission Configuration Indication' field of a detected PDCCH having DCI to determine a PDSCH antenna port QCL.

When a time offset between reception of DL DCI and a corresponding PDSCH is equal to or greater than a predetermined threshold (e.g., timeDurationForQCL), UE may assume that a DMRS port of a PDSCH of a serving cell is quasi-colocated with RS(s) in a TCI state for QCL type parameter(s) given by an indicated TCI state.

When a single slot PDSCH is configured for UE, an indicated TCI state may be based on an activated TCI state of a slot having a scheduled PDSCH.

When multiple-slot PDSCHs are configured for UE, an indicated TCI state may be based on an activated TCI state of a first slot having a scheduled PDSCH and UE may expect that activated TCI states across slots having a scheduled PDSCH are the same.

When a CORESET associated with a search space set for cross-carrier scheduling is configured for UE, UE may expect that a tci-PresentInDCI parameter is set to be enabled for a corresponding CORESET. When one or more TCI states are configured for a serving cell scheduled by a search space set including QCL-TypeD, UE may expect that a time offset between reception of a PDCCH detected in the search space set and a corresponding PDSCH is equal to or greater than a predetermined threshold (e.g., timeDurationForQCL).

For both of a case in which a parameter tci-PresentInDCI is set to be enabled and a case in which tci-PresentInDCI is not configured in a RRC connected mode, when a time offset between reception of DL DCI and a corresponding PDSCH is less than a predetermined threshold (e.g., timeDurationForQCL), UE may assume that a DMRS port of a PDSCH of a serving cell is quasi-colocated with RS(s) for QCL parameter(s) used for PDCCH QCL indication of a CORESET associated with a monitored search space having the lowest CORESET-ID in the latest slot where one or more CORESETs in an activated BWP of a serving cell is monitored by UE.

In this case, when QCL-TypeD of a PDSCH DMRS is different from QCL-TypeD of a PDCCH DMRS and they are overlapped in at least one symbol, UE may expect that reception of a PDCCH associated with a corresponding CORESET will be prioritized. It may be also applied to intra-band CA (carrier aggregation) (when a PDSCH and a CORESET exist in a different CC). When any of configured TCI states does not include QCL-TypeD, a different QCL assumption may be obtained from TCI states indicated for a scheduled PDSCH, regardless of a time offset between reception of DL DCI and a corresponding PDSCH.

For a periodic CSI-RS resource of configured NZP-CSI-RS-ResourceSet including a higher layer parameter trs-Info, UE may expect a TCI state to indicate one of the following QCL type(s).

QCL-TypeC with a SS/PBCH block, and if applicable, QCL-TypeD with the same SS/PBCH block, or QCL-TypeC with a SS/PBCH block, and if applicable, QCL-TypeD with a CSI-RS resource in configured NZP-CSI-RS-ResourceSet including a higher layer parameter repetition For an aperiodic CSI-RS resource of configured NZP-CSI-RS-ResourceSet including a higher layer parameter trs-Info, UE may expect a TCI state to indicate QCL-TypeA with a periodic CSI-RS resource of NZP-CSI-RS-Resource- Set including a higher layer parameter trs-Info, and if applicable, QCL-TypeD with the same periodic CSI-RS resource.

For a CSI-RS resource of NZP-CSI-RS-ResourceSet configured without a higher layer parameter trs-Info and without a higher layer parameter repetition, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a SS/PBCH block, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or when QCL-TypeD is not applicable, QCL-TypeB with a CSI-RS resource in configured NZP-CSI-RS-ResourceSet including a higher layer parameter trs-Info.

For a CSI-RS resource of configured NZP-CSI-RS-ResourceSet including a higher layer parameter repetition, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeC with a SS/PBCH block, and if applicable, QCL-TypeD with the same SS/PBCH block.

For a DMRS of a PDCCH, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeA with a CSI-RS resource of NZP-CSI-RS-ResourceSet configured without a higher layer parameter trs-Info and without a higher layer parameter repetition, and if applicable, QCL-TypeD with the same CSI-RS resource.

For a DMRS of a PDSCH, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeA with a CSI-RS resource of NZP-CSI-RS-ResourceSet configured without a higher layer parameter trs-Info and without a higher layer parameter repetition, and if applicable, QCL-TypeD with the same CSI-RS resource.

Multiple TRP (M-TRP) Related Operation

Figure 7:
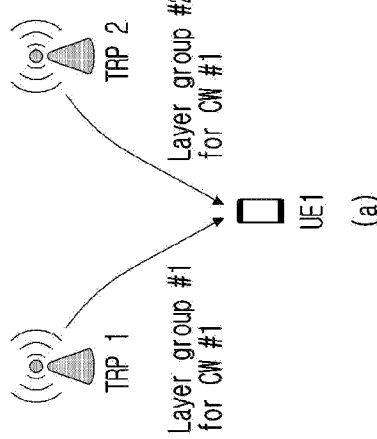
FIG. 7 illustrates a multiple Transmission and Reception Point (TRP) transmission scheme in a wireless communication system to which the present disclosure may be applied.

FIG. 7 illustrates a method of multiple TRPs transmission in a wireless communication system to which the present disclosure may be applied.

In reference to FIG. 7(a), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(b), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(b), it may have a disadvantage that a code rate corresponding to a TB is higher compared to FIG. 7(a). However, it has an advantage that it may adjust a code rate by indicating a different RV (redundancy version) value or may adjust a modulation order of each CW for encoded bits generated from the same TB according to a channel environment.

According to methods illustrated in FIG. 7(a) and FIG. 7(b) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be extended and applied to a frequency division multiplexing (FDM) method based on different frequency domain resources (e.g., RB/PRB (set), etc.) and/or a time division multiplexing (TDM) method based on different time domain resources (e.g., slots, symbols, sub-symbols, etc.).

Regarding a method for multiple TRPs based URLLC scheduled by single DCI, the following methods are discussed.

1) Method 1 (SDM): Time and Frequency Resource Allocation is Overlapped and n (n<=Ns) TCI States in a Single Slot 1-a) Method 1a.

The same TB is transmitted in one layer or layer set at each transmission time (occasion) and each layer or each layer set is associated with one TCI and one set of DMRS port(s).

A single codeword having one RV is used in all spatial layers or all layer sets. With regard to UE, different coded bits are mapped to a different layer or layer set by using the same mapping rule 1-b) Method 1b The same TB is transmitted in one layer or layer set at each transmission time (occasion) and each layer or each layer set is associated with one TCI and one set of DMRS port(s).

A single codeword having one RV is used in each spatial layer or each layer set. RV(s) corresponding to each spatial layer or each layer set may be the same or different.

1-c) Method 1c

The same TB having one DMRS port associated with multiple TCI state indexes is transmitted in one layer at one transmission time (occasion) or the same TB having multiple DMRS ports one-to-one associated with multiple TCI state indexes is transmitted in one layer.

In case of the above-described method 1a and 1c, the same MCS is applied to all layers or all layer sets.

2) Method 2 (FDM): Frequency Resource Allocation is not Overlapped and n (n<=Nf) TCI States in a Single Slot Each non-overlapping frequency resource allocation is associated with one TCI state.

The same single/multiple DMRS port(s) are associated with all non-overlapping frequency resource allocation.

2-a) Method 2a

A single codeword having one RV is used for all resource allocation. With regard to UE, common RB matching (mapping of a codeword to a layer) is applied to all resource allocation.

2-b) Method 2b

A single codeword having one RV is used for each non-overlapping frequency resource allocation. A RV corresponding to each non-overlapping frequency resource allocation may be the same or different.

For the above-described method 2a, the same MCS is applied to all non-overlapping frequency resource allocation.

3) Method 3 (TDM): Time Resource Allocation is not Overlapped and n (n<=Nt1) TCI States in a Single Slot Each transmission time (occasion) of a TB has time granularity of a mini-slot and has one TCI and one RV.

A common MCS is used with a single or multiple DMRS port(s) at all transmission time (occasion) in a slot.

A RV/TCI may be the same or different at a different transmission time (occasion).

4) Method 4 (TDM): N (n<=Nt2) TCI States in K (n<=K) Different Slots

Each transmission time (occasion) of a TB has one TCI and one RV.

All transmission time (occasion) across K slots uses a common MCS with a single or multiple DMRS port(s).

A RV/TCI may be the same or different at a different transmission time (occasion).

Downlink Multiple TRP (M-TRP) URLLC Transmission Operation

DL MTRP URLLC transmission method means that multiple TRPs transmit the same data/DCI by using a different space (e.g., layer, port)/time/frequency resource. For example, TRP 1 transmits the specific data/DCI in resource 1 and TRP 2 transmits the specific data/DCI (i.e., same data/DCI) in resource 2

UE configured with a DL MTRP-URLLC transmission method receives the same data/DCI by using a different layer/time/frequency resource. Here, UE may receive an indication of the QCL RS/type (i.e., DL TCI state) used in the space/time/frequency resource for receiving the corresponding data/DCI from the base station.

For example, when the data/DCI is received in resource 1 and resource 2, a DL TCI state used in resource 1 and a DL TCI state used in resource 2 may be indicated. UE may achieve high reliability because it receives the data/DCI through resource 1 and resource 2. Such DL MTRP URLLC may be applied to a PDSCH/a PDCCH.

UL MTRP-URLLC transmission method means that multiple TRPs receive the same data/UCI from any UE by using a different space/time/frequency resource. For example, TRP 1 may receive the same data/DCI from UE in resource 1 and TRP 2 may receive the same data/DCI from UE in resource 2. And, TRP 1 and TRP 2 may share data/UCI received from the UE through a backhaul link (connected between TRPs).

That is, UE configured with a UL MTRP-URLLC transmission method may transmit the same data/UCI by using a different space/time/frequency resource. Here, the UE may be indicated by the base station for a Tx beam and Tx power (i.e., UL TCI state) to be used in space/time/frequency resources for transmitting the same data/UCI. For example, when the same data/UCI is transmitted in resource 1 and resource 2, the UE may be indicated by the base station to indicate the UL TCI state used in resource 1 and the UL TCI state used in resource 2 from the base station. This UL M-TRP URLLC may be applied to PUSCH/PUCCH.

In addition, in describing the present disclosure, when receiving/transmitting data/DCI/UCI through a specific space/time/frequency resource, using (or mapping) a specific TCI state (or TCI) may mean that, for DL, estimating a channel from the DMRS using the QCL type and QCL RS indicated by a specific TCI state in a specific space/time/frequency resource, and receiving/demodulating data/DCI/UCI with the estimated channel.

In addition, when receiving/transmitting data/DCI/UCI through a specific space/time/frequency resource, using (or mapping) a specific TCI state (or, TCI) may mean that, for UL, DMRS and data/UCI are transmitted/modulated using a Tx beam and/or Tx power indicated by a specific TCI state in a specific space/time/frequency resource.

And, the UL TCI state may include Tx beam or Tx power information of the UE. In addition, the base station may configure spatial relation information or the like for the UE through other parameters instead of the TCI state.

For example, the UL TCI state may be directly indicated to the UE through a UL grant DCI. Alternatively, the UL TCI state may mean spatial relationship information of an SRS resource indicated through an SRS resource indicator (SRI) field of a UL grant DCI. Alternatively, the UL TCI state may mean an open loop (OP) Tx power control parameter connected to a value indicated through the SRI field of the UL grant DCI.

Here, the OL Tx power control parameter may include, for example, j (index and alpha for OP parameter(s) Po (maximum 32 parameter values set per cell), q_d (index of DL RS resources for PL (path loss) measurement (up to 4 measurements per cell), or/and I (closed loop power control process index (up to 2 processes per cell)).

As another embodiment of the present disclosure, the M-TRP eMBB transmission method refers to a method in which M-TRP transmits different data/DCI using different space/time/frequency resources. If the M-TRP eMBB transmission method is configured, it may be assumed that the UE receives a plurality of TCI states from the base station through DCI, and that data received using QCL RSs indicated by each of the plurality of TCI states are different from each other.

In addition, since the RNTI for M-TRP URLLC and the M-TRP eMBB RNTI are separately used, the UE may determine whether a specific transmission/reception is M-TRP URLLC transmission/reception or M-TRP eMBB transmission/reception. For example, when RNTI for URLLC is used and CRC masking is performed for DCI, the UE may determine the corresponding transmission as URLLC transmission. In addition, when the RNTI for eMBB is used and CRC masking is performed for DCI, the UE may determine the corresponding transmission as eMBB transmission. As another example, the base station may configure the M-TRP URLLC transmission/reception method or the M-TRP eMBB transmission/reception method to the UE through new signaling.

For convenience of description of the present disclosure, it has been assumed that 2 TRPs cooperate with each other to perform a transmission/reception operation, but the present disclosure is not limited thereto. That is, the present disclosure may be extended and applied even in a multi-TRP environment of 3 or more, and may be extended and applied even in an environment in which transmission/reception is performed in different panels or beams in the same TRP. The UE may recognize different TRPs as different TCI states. That the UE transmits/receives data/DCI/UCI using TCI state 1 means that it transmits/receives data/DCI/UCI/from TRP 1 (or to TRP 1).

The present disclosure may be utilized in a situation in which the M-TRP cooperatively transmits the PDCCH (repetitively transmits or divides the same PDCCH). In addition, the present disclosure may be utilized in a situation in which M-TRP cooperatively transmits PDSCH or cooperatively receives PUSCH/PUCCH.

In addition, in describing the present disclosure, repeatedly transmitting the same PDCCH by a plurality of base stations (M-TRP) may mean transmitting the same DCI through a plurality of PDCCH candidates and has the same meaning that multiple base stations repeatedly transmit the same DCI. Here, two DCIs having the same DCI format/size/payload may be viewed as the same DCI.

Alternatively, if the scheduling results are the same even if the payloads of the two DCIs are different, the two DCIs may be regarded as the same DCI. For example, the time domain resource allocation (TDRA) field of DCI may relatively determine the slot/symbol position of data and the slot/symbol position of A (ACK)/N (NACK) based on the reception time of the DCI.

In this case, when the DCI received at time n and the DCI received at time n+1 indicate the same scheduling result to the UE, the TDRA fields of the two DCIs are different, and as a result, the DCI payload is different from each other. Accordingly, even if the payloads of the two DCIs are different, if the scheduling results are the same, the two DCIs may be regarded as the same DCI. Here, the number of repetitions R may be directly indicated by the base station to the UE or mutually promised.

Alternatively, even if the payloads of the two DCIs are different and the scheduling results are not the same, when the scheduling result of one DCI is a subset of the scheduling result of the other DCI, the two DCIs may be regarded as the same DCI.

For example, if the same data is TDM and repeatedly transmitted N times, DCI 1 received before the first data indicates (or schedules) repetition of data N times, and DCI 2 received before the second data indicates repetition (scheduling) of data N−1. In this case, the scheduling result (or data) of DCI 2 becomes a subset of the scheduling result (or data) of DCI 1, and both DCIs have scheduling results for the same data. Accordingly, even in this case, the two DCIs may be regarded as the same DCI.

And, in describing the present disclosure, dividing and transmitting the same PDCCH by a plurality of base stations may mean that one DCI is transmitted through one PDCCH candidate, but TRP 1 transmits some resources defined for the corresponding PDCCH candidate and TRP 2 transmits the remaining resources.

For example, when TRP 1 and TRP 2 divide and transmit PDCCH candidates corresponding to aggregation level m1+m2, a PDCCH candidate may be divided into PDCCH candidate 1 corresponding to aggregation level m1 and PDCCH candidate 2 corresponding to aggregation level m2, TRP 1 may transmit PDCCH candidate 1, and TPR 2 may transmit PDCCH candidate 2. In this case, TRP 1 and TRP 2 may transmit PDCCH candidate 1 and PDCCH candidate 2 using different time/frequency resources. After receiving the PDCCH candidate 1 and the PDCCH candidate 2, the UE may generate a PDCCH candidate corresponding to the aggregation level m1+m2 and attempt DCI decoding.

In this case, the method in which the same DCI is divided and transmitted to several PDCCH candidates may be implemented in the following two methods.

The first method is a method in which DCI payload (e.g., control information+CRC) is encoded through one channel encoder (e.g., polar encoder) and divided into two TRPs and transmitted. That is, the first method means a method of dividing and transmitting the coded bits obtained according to the encoding result in two TRPs. Here, the entire DCI payload may be encoded in the coded bit transmitted by each TRP, but is not limited thereto, and only some DCI payloads may be encoded.

The second method divides the DCI payload (e.g., control information+CRC) into two DCIs (DCI 1 and DCI 2) and encodes each of them through a channel encoder (e.g., a polar encoder). Thereafter, each of the two TRPs may transmit a coded bit corresponding to DCI 1 and a coded bit corresponding to DCI 2 to the terminal.

That is, dividing/repeating the same PDCCH by a plurality of base stations (M-TRP) and transmitting over a plurality of monitoring occasions (MOs) may mean that 1) the coded bit encoding the entire DCI content of the corresponding PDCCH is repeatedly transmitted through each MO for each base station (S-TRP), 2) the coded bit encoding the entire DCI content of the corresponding PDCCH is divided into a plurality of parts, and each base station (S-TRP) transmits different parts through each MO, or 3) the DCI content of the corresponding PDCCH is divided into a plurality of parts, and different parts are encoded for each base station (S-TRP) (that is, separately encoded) and transmitted through each MO.

Repeatedly/split transmission of the PDCCH may be understood as transmitting the PDCCH multiple times over several transmission occasions (TO).

Here, TO may mean a specific time and/or frequency resource unit in which the PDCCH is transmitted. For example, when the PDCCH is transmitted multiple times (to a specific RB) over slots 1, 2, 3, and 4, TO may mean each slot. As another example, if the PDCCH is transmitted multiple times (in a specific slot) over RB sets 1, 2, 3, and 4, TO may mean each RB set. As another example, if the PDCCH is transmitted multiple times over different times and frequencies, TO may mean each time/frequency resource. In addition, the TCI state used for DMRS channel estimation may be set differently for each TO, and it may be assumed that the TOs in which the TCI state is set differently are transmitted by different TRPs/panels.

Repeatedly transmitting or dividing the PDCCH by a plurality of base stations may mean that the PDCCH is transmitted over multiple TOs, and the union of the TCI states configured in the corresponding TOs consists of two or more TCI states. For example, PDCCH transmitting over TO 1,2,3,4 may mean that TCI states 1,2,3,4 are configured in each of TO 1,2,3,4 and TRP i cooperatively transmits the PDCCH in TO i.

In describing the present disclosure, repeatedly transmitting the same PUSCH to a plurality of base stations (i.e., M-TRP) by the UE may mean that the UE transmits the same data through a plurality of PUSCHs, and each PUSCH may be transmitted by being optimized for UL channels of different TRPs.

For example, the UE may repeatedly transmit the same data through PUSCH 1 and PUSCH 2. In this case, PUSCH 1 may be transmitted using UL TCI state 1 for TRP 1, and link adaptation such as precoder/MCS may also be scheduled to receive a value optimized for the channel of TRP 1 to transmit the PUSCH. PUSCH 2 is transmitted using UL TCI state 2 for TRP 2, and link adaptation such as a precoder/MCS may also be scheduled for a value optimized for the channel of TRP 2 to transmit the PUSCH. In this case, the repeatedly transmitted PUSCH 1 and PUSCH 2 may be transmitted at different times to be TDM, FDM, or SDM.

In addition, in describing the present disclosure, transmitting, by UE to a plurality of base stations (i.e., M-TRP), the same PUSCH by dividing it may mean that one data is transmitted through one PUSCH, but the resources allocated to the PUSCH are divided and optimized for UL channels of different TRPs for transmission.

For example, the UE may transmit the same data through a 10-symbol PUSCH. At this time, the first 5 symbols among 10 symbols may be transmitted using UL TCI state 1 for TRP 1, and the UE may transmit a 5-symbol PUSCH (to TRP 1) by receiving a link adaptation such as precoder/MCS and scheduling a value optimized for a channel of TRP 1. The remaining 5 symbols may be transmitted using UL TCI state 2 for TRP 2, and the UE may transmit the remaining 5-symbol PUSCH (with TRP 2) by receiving a link adaptation such as precoder/MCS and scheduling a value optimized for the channel of TRP 2.

In the above example, a method of dividing one PUSCH into time resources and performing TDM transmission for TRP 1 and TRP 2 has been described. However, the present disclosure is not limited thereto, and the UE may divide and transmit the same PUSCH to a plurality of base stations by using the FDM/SDM method.

The UE may repeatedly transmit the PUCCH to a plurality of base stations (similar to PUSCH transmission) or divide and transmit the same PUCCH.

And, when a plurality of TOs are indicated for the terminal in order to repeatedly transmit PDCCH/PDSCH/PUSCH/PUCCH or divide and transmit PDCCH/PDSCH/PUSCH/PUCCH, for each TO, UL may be transmitted toward a specific TRP, or DL may be received from a specific TRP. At this time, the UL TO (or the TO of TRP 1) transmitted toward TRP 1 may mean a TO using a first value of two spatial relations, two UL TCIs, two UL power control parameters or two pathloss (PL)-RS indicated to the terminal. And, UL TO (or TO of TRP 2) transmitted toward TRP 2 may mean a TO using a second value of two spatial relations, two UL TCIs, two UL power control parameters, or two PL-RSs indicated to the UE.

Similarly, in the case of DL transmission, the DL TO transmitted by TRP 1 (or TO of TRP 1) may mean a TO using a first value of two DL TCI states indicated to the terminal (e.g., when two TCI states are set in CORESET), and the DL TO transmitted by TRP 2 (or TO of TRP 2) may mean a TO using a second value of two DL TCI states indicated to the terminal (e.g., two TCI states are set in CORESET).

The present disclosure may be extended and applied to various channels such as PUSCH/PUCCH/PDSCH/PDCCH. In addition, the present disclosure may be extended and applied to both the case of repeatedly transmitting the channel and the case of dividing and transmitting the channel in different space/time/frequency resources.

In addition, in terms of the DCI transmission, the M-TRP transmission scheme may be divided into i) a multiple DCI (M-DCI)-based M-TRP transmission scheme in which each TRP transmits a different DCI, and ii) a single DCI (S-DCI)-based M-TRP transmission scheme in which one TRP transmits a DCI. For example, in the case of S-DCI, since all scheduling information for data transmitted by the M-TRP need to be transferred through one DCI, it may be used in an ideal BackHaul (ideal BH) environment where dynamic cooperation between two TRPs is possible.

Related to Enhanced M-TRP Transmission and Reception

With respect to M-TRP transmission/reception in Rel-16 NR standardization, PDSCH transmission/reception according to the S-DCI based M-TRP transmission scheme and the M-DCI based M-TRP transmission scheme is supported.

First, an S-DCI based M-TRP PDSCH transmission scheme will be described.

One of SDM/FDM/TDM schemes may be used for S-DCI based M-TRP PDSCH transmission. In the case of SDM, the base station transmits one TB using a multi-layer, but transmits layers belonging to different DMRS CDM groups with different Tx beams (i.e., QCL RS or TCI state). Through this, the transmission capacity may be improved by increasing the number of layers compared to the existing S-TRP transmission scheme. In addition, when one TB is transmitted using multiple layers, some layers are transmitted to TRP 1 and the other layers are transmitted to TRP 2, whereby channel reliability due to diversity gain may be improved.

In the case of FDM, scheme 2a and 2b are supported. Here, scheme 2a is a scheme in which one TB is transmitted using a multi-RB, but RBs belonging to different RB groups are transmitted using different Tx beams (i.e., QCL RS or TCI state). Scheme 2b is a scheme for transmitting the same TB using different RB groups, but transmitting RBs belonging to different RB groups using different Tx beams (i.e., QCL RS or TCI state). In the case of TDM, schemes 3 and 4, are supported. Here, scheme 4 (i.e., inter-slot TDM) is a scheme for repeatedly transmitting the same TB in several slots, but transmitting slots belonging to different slot groups using different Tx beams (i.e., QCL RS or TCI state). On the other hand, Scheme 3 (i.e., intra-slot TDM) is a scheme for repeatedly transmitting the same TB in several OFDM symbol groups, but transmitting some OFDM symbol groups and the remaining OFDM symbol groups using different Tx beams (i.e., QCL RS or TCI state).

Next, an M-DCI based M-TRP PDSCH transmission scheme will be described.

M-DCI based MTRP PDSCH transmission is a scheme in which each TRP schedules and transmits a PDSCH through DCI. That is, TRP 1 transmits PDSCH 1 through DCI 1, and TRP 2 transmits PDSCH 2 through DCI 2. When PDSCH 1 and PDSCH 2 overlap on the same frequency and time resource, since two PDSCHs are received for the same RE, resource efficiency is increased and transmission capacity is increased. For this, the concept of a CORESET pool, which means a group of several CORESETs, has been introduced. For example, TRP 1 transmits a PDCCH through CORESET belonging to CORESET pool 0, and also transmits a PDSCH scheduled by the corresponding PDCCH. TRP 2 transmits a PDCCH through CORESET belonging to CORESET pool 1, and also transmits a PDSCH scheduled by the corresponding PDCCH.

Even in the case of PUSCH, a specific TRP may schedule PUSCH transmission to the UE through CORESET belonging to each CORESET pool. For example, some PUCCH resources may be scheduled by TRP 1, and the remaining PUCCH resources may be scheduled by TRP 2. The UE may transmit an independent PUSCH/PUCCH for each of TRPs 1 and 2.

In addition, the UE may recognize a PUSCH (or PUCCH) scheduled by DCI received based on different CORESETs (or CORESETs belonging to different CORESET groups) as a PUSCH (or PUCCH) transmitted to different TRPs or as a PUSCH (or PUCCH) of a different TRP. In addition, the scheme for UL transmission (e.g., PUSCH/PUCCH) transmitted to different TRPs may be equally applied to UL transmission transmitted to different panels belonging to the same TRP.

In addition, the CORESET group ID (or CORESET pool index with the same meaning) described/mentioned in the present disclosure may mean index/identification information (e.g., ID) for distinguishing CORESET for each TRP/panel. In addition, the CORESET group may mean a group/union of CORESETs distinguished by index/identification information (e.g., ID)/CORESET group ID for distinguishing CORESETs for each TRP/panel. As an example, the CORESET group ID may be specific index information defined in CORESET configuration. That is, the CORESET group may be configured/indicated/defined by the index defined in the CORESET configuring for each CORESET. And/or, the CORESET group ID may mean an index/identification information/indicator for classification/identification between CORESETs configured/related to each TRP/panel.

CORESET group ID described/mentioned in this disclosure may be expressed by being replaced with a specific index/specific identification information/specific indicator for classification/identification between CORESETs set/associated with each TRP/panel. Corresponding information may be configured/indicated through higher layer signaling (e.g., RRC signaling, MAC-CE, etc.) and/or physical layer signaling (e.g., DCI). As an example, it may be configured/indicated to perform PDCCH detection for each TRP/panel in a corresponding CORESET group unit, and UCI (e.g., CSI, HARQ-ACK/NACK, SR, etc.) for each TRP/panel in a corresponding CORESET group unit. And/or uplink physical channel resources (e.g., PUCCH/PRACH/SRS resources) may be configured/indicated to be managed/controlled separately. And/or, HARQ ACK/NACK (process/retransmission) for PDSCH/PUSCH, etc. scheduled for each TRP/panel in units of the corresponding CORESET group may be managed.

For example, the higher layer parameter ControlResourceSet IE (information element) is used to configured a time/frequency control resource set (control resource set, CORESET). The corresponding CORESET may be related to detection/reception of downlink control information. The ControlResourceSet IE may include a CORESET-related ID (e.g., controlResourceSetID)/CORESET pool index for CORESET (e.g., CORESETPoolIndex)/time/frequency resource setting of CORESET/TCI information related to CORESET. As an example, the index of the CORESET pool (e.g., CORESETPoolIndex) may be configured to 0 or 1. In the above description in the present disclosure, a CORESET group may correspond to a CORESET pool, and a CORESET group ID may correspond to a CORESET pool index (e.g., CORESETPoolIndex). The aforementioned ControlResourceSet (ie, CORESET) may be configured through higher layer signaling (e.g., RRC signaling).

Additionally, in relation to M-TRP transmission and reception in Rel-17 NR standardization, M-TRP PDCCH/PDSCH SFN transmission, S-DCI based M-TRP PUSCH repetition transmission, and single PUCCH resource based M-TRP PUCCH repetition transmission are supported. In the transmission schemes, the same contents (i.e., DCI/UL TB/UCI, etc.) are repeatedly transmitted by improving the URLLC target for increasing reliability. Here, M-TRP PDCCH repetition transmission is performed based on TDM or FDM, M-TRP PDCCH/PDSCH SFN transmission is performed in the same time/frequency/layer, and S-DCI based M-TRP PUSCH repetition transmission is performed based on TDM, and a single PUCCH resource based M-TRP PUCCH repetition transmission is performed based on TDM.

First, the S-DCI based M-TRP PDCCH repetition transmission scheme will be described.

In NR Rel-17 standardization, a plurality of CORESETs in which different TCI states (i.e., different QCL RSs) are configured for M-TRP PDCCH repetition transmission are configured to the terminal, and a plurality of SS sets respectively connected to the corresponding CORESETs are configured. The base station may indicate/configured that the SS set connected to one CORESET and the SS set connected to another CORESET are linked for repetition transmission to the terminal. Through this, the terminal may recognize that PDCCH candidates of the corresponding SS set are repeatedly transmitted.

For example, two CORESETs, CORESET 0 and CORESET 1, may be configured to the terminal, CORESET 0 and CORESET 1 may be connected to SS set 0 and SS set 1, respectively, and SS set 0 and SS set 1 may be linked. The terminal may recognize that the same DCI is repeatedly transmitted in the PDCCH candidate of SS set 0 and the PDCCH candidate of SS set 1, and based on a specific rule, the terminal may recognize that the specific PDCCH candidate of SS set 0 and the specific PDCCH candidate of SS set 1 correspond to a pair configured for repeatedly transmitting the same DCI. The two PDCCH candidates may be referred to as linked PDCCH candidates, and when the terminal properly receives any one of the two PDCCH candidates, the corresponding DCI may be successfully decoded. However, when receiving the PDCCH candidate of SS set 0, the terminal may use the QCL RS (i.e., DL beam) of the TCI state of CORESET 0 connected to SS set 0, and when receiving the PDCCH candidate of SS set 1, the terminal may use the QCL RS (ie, DL beam) of the TCI state of CORESET 1 connected to SS set 1. Accordingly, the terminal receives the associated PDCCH candidates using different beams.

Next, the M-DCI based M-TRP PDCCH repetition transmission scheme will be described.

As one of the M-TRP PDCCH repetition transmission types, a plurality of TRPs may repeatedly transmit the same DCI through the same time/frequency/DMRS port, and such a transmission method may be referred to as SFN PDCCH transmission. However, for SFN PDCCH transmission, the base station configures a plurality of TCI states in one CORESET instead of configuring a plurality of CORESETs in which different TCI states are configured. When the terminal receives the PDCCH candidate through the SS set connected to the one CORESET, the terminal may perform channel estimation of the PDCCH DMRS and attempt decoding by using all of the plurality of TCI states.

In addition, during the above-described M-TRP PDSCH repetition transmission, the two TRPs repeatedly transmit the corresponding channel to different resources. However, when the resources used by the two TRPs are the same, that is, when the same channel is repeatedly transmitted through the same frequency/time/layer (i.e., DMRS port), the reliability of the corresponding channel may be improved. In this case, since the same channel repeatedly transmitted is received while being transmitted (i.e., air) because the resources are not distinguished, it may be recognized as one channel (e.g., a composite channel) from a reception side (e.g., terminal). For SFN PDSCH transmission, two DL TCI states for PDSCH DMRS reception may be configured in the terminal.

Next, the S-DCI based M-TRP PUSCH repetition transmission scheme will be described.

In NR Rel-17 standardization, the base station configured two SRS sets to the terminal for S-DCI based M-TRP PUSCH transmission, and each set is used for indicating UL beam/QCL information for a UL Tx port for TRP 1 and TRP 2. In addition, the base station may indicate the SRS resource for each SRS resource set through two SRI fields included in one DCI, and may indicate up to two PC parameter sets. For example, the first SRI field may indicate the SRS resource and PC parameter set defined in SRS resource set 0, and the second SRI field may indicate the SRS resource and PC parameter set defined in SRS resource set 1. The terminal may be indicated with UL Tx port, PC parameter set, and UL beam/QCL information for TRP 1 through the first SRI field, and through this, the terminal performs PUSCH transmission in the TO corresponding to SRS resource set 0. Similarly, the terminal may be indicated with UL Tx port, PC parameter set, and UL beam/QCL information for TRP 2 through the second SRI field, and through this, the terminal performs PUSCH transmission in the TO corresponding to SRS resource set 1.

Next, the Single PUCCH resource based M-TRP PUCCH repetition transmission scheme will be described.

In NR Rel-17 standardization, the base station may activate/configure two spatial relation info on a single PUCCH resource to the terminal for the Single PUCCH resource based M-TRP PUCCH transmission (if FR1, enable/configure two PC parameter sets). When UL UCI is transmitted through the corresponding PUCCH resource, each spatial relation info is used to indicate to the terminal the spatial relation info for TRP 1 and TRP 2, respectively. For example, through the value indicated in the first spatial relation info, the terminal is indicated with Tx beam/PC parameter(s) toward TRP 1, and the terminal perform PUCCH transmission in TO corresponding to TRP 1 using corresponding information. Similarly, through the value indicated in the second spatial relation info, the terminal is indicated with Tx beam/PC parameter(s) toward TRP 2, and the terminal performs PUCCH transmission in the TO corresponding to TRP 2 using the corresponding information.

In addition, for M-TRP PUCCH repetition transmission, the configuring scheme is improved so that two spatial relation info may be configured in the PUCCH resource. That is, when power control (PC) parameters such as PLRS, Alpha, PO, and Closed loop index are set in each spatial relation info, spatial relation RS may be configured. As a result, PC information and spatial relation RS information corresponding to two TRPs may be configured through two spatial relation info. Through this, the terminal transmits UCI (i.e., CSI, ACK/NACK, SR, etc.) PUCCH in the first TO using the first spatial relation info, and transmits the same UCI PUCCH in the second TO using the second spatial relation info. In the present disclosure, a PUCCH resource in which two spatial relation info is configured is referred to as an M-TRP PUCCH resource, and a PUCCH resource in which one spatial relation info is configured is referred to as an S-TRP PUCCH resource.

In the overall description and/or proposed method of the present disclosure, the meaning of using/mapping a specific TCI state (or TCI) when transmitting/receiving data/DCI/UCI for a certain frequency/time/spatial resource may mean, in the case of DL, estimating a channel from the DMRS using the QCL type and QCL RS indicated by the corresponding DL TCI state in the corresponding frequency/time/spatial resource and receiving/demodulating the estimated data/DCI. In addition, in the case of UL, the corresponding meaning may mean transmitting/modulating DMRS and data/UCI using the Tx beam and/or Tx power indicated by the UL TCI state in the corresponding frequency/time/spatial resource.

Here, the UL TCI state may include information for the Tx beam and/or Tx power of the terminal, and spatial relation info, etc. may be configured to the terminal through other parameters instead of the TCI state. The UL TCI state may be directly indicated by the UL grant DCI, and may mean spatial relation info of the SRS resource indicated through the SRI field of the UL grant DCI. Alternatively, the UL TCI state is an Open Loop (OL) Tx power control parameter (e.g., j: index for open loop parameters Po & alpha (maximum 32 parameter value sets per cell), q_d: index of DL RS resource for PL measurement (maximum 4 measurements per cell), 1: may mean closed loop power control process index (maximum 2 processes per cell)) connected to a value indicated through the SRI field of the UL grant DCI. In addition, the UL TCI state may be indicated through DL grant DCI as well as UL grant DCI.

In the present disclosure, for convenience of explanation, the proposed method(s) was applied assuming cooperative transmission/reception between 2 TRPs, but the proposed method(s) may be extended and applied even in a multi-TRP environment of 3 or more, and multiple It may be extended and applied even in the panel environment. Here, different TRPs may be recognized by the terminal as different TCI states, and when the terminal transmits and receives data/DCI/UCI using the first TCI state (i.e., TCI state 1), it may mean transmitting and receiving data/DCI/UCI to/from first TRP (i.e., TRP 1).

In the present disclosure, TO (Transmission Occasion) may mean each channel transmitted at different times when multiple channels are TDMed, and when multiple channels are FDM, it may mean each channel transmitted at different frequencies/RBs, and when multiple channels are SDM, it may mean each channel transmitted to a different layer/beam/DMRS port. One TCI state may be mapped to each TO. When the same channel is repeatedly transmitted, intact data/DCI/UCI is transmitted to one TO, and the receiving side may receive multiple TOs and then the reception success rate may be increased.

A Method for Configuring/Indication for Multiple Panels Based Simultaneous Transmission Scheme In the present disclosure, '/' may mean 'and', 'or', or 'and/or' depending on the context. QCL type-D RS, TCI state, or TCI in the present disclosure may mean a spatial parameter, that is, a QCL reference RS from a beam perspective, and may be expanded and interpreted as a reference RS or source RS for the corresponding parameters or other beam/spatial-related parameters. Additionally, in an environment where analog beamforming is not used, such as a low frequency band, the indication of QCL type-D RS may be omitted. In this case, QCL type-D RS in the present disclosure may can be interpreted as QCL standard RS. That is, if there is only one reference RS in the TCI state, QCL type-D RS may refer to the corresponding reference RS.

Additionally, from a UL perspective, a TCI state (or TCI) may refer to and include a reference/source RS for a UL beam, and may indicate the spatial relation RS (and pathloss RS) in the existing Rel-15/16 NR standardization. Here, the pathloss RS may be configured to be the same as the corresponding RS, related to the UL TCI state, or included separately.

In Rel-18 NR standardization, support of simultaneous transmission across multiple panels (STxMP) transmission of the UE is being considered to improve capacity, coverage, and/or reliability on the uplink (UL) side. In this disclosure, STxMP may be referred to as multiple panels based simultaneous transmission scheme, multi-spatial parameter-based simultaneous uplink transmission, etc. As an example, a panel may be an object implemented in association with a spatial parameter.

In the case of the STxMP method described above, the UE may simultaneously generate a plurality of transmission beams (e.g., UL beams) using a plurality of panels of the UE and perform simultaneous UL transmission based on the plurality of transmission beams. At this time, the STxMP transmission method may be classified into Scheme 1 and Scheme 2 (in detail, Scheme 2-1 and Scheme 2-2) as follows.

Scheme 1. The UE transmits the same signal on each panel

Scheme 2. The UE transmits different signals in each panel.

(Scheme 2-1) The UE transmits multiple layers/ports constituting the same channel/RS resource to each panel.

(Scheme 2-2) The UE transmits different channels/RS resources in each panel.

Here, Scheme 1 may be for improving UL reliability and/or coverage. Scheme 1 may be a method that applies the DL single frequency network (SFN) transmission method from the perspective of Rel-17 M-TRP to multiple panel transmission in UL (i.e., a method in which multiple TRPs transmit the same signal to the same time/frequency resource in DL). That is, each UE panel of UL transmission may correspond to each TRP of UL. Scheme 1 may be referred to as the (UL) SFN STxMP method.

Here, Scheme 2 may be for improving UL capacity, throughput, data rate, and/or efficiency. Scheme 2-1 may be a method of applying M-TRP-based NCJT transmission to uplink multiple panel transmission. Scheme 2-1 may be referred to as the (UL) spatial division multiplexing (SDM) STxMP method. Scheme 2-2 may be a method of transmitting different signals through each panel (e.g., one panel transmits PUCCH and the other panel transmits SRS) using the same time/frequency resources.

At this time, the only difference between Scheme 1 and Scheme 2-1 is whether it is the same layer/port-based transmission or a different layer/port-based transmission, Resource allocation methods for channel/RS resources may be the same/similar.

In the present disclosure, particularly with respect to PUSCH transmission, while solving the above-mentioned problems, methods for indicating Scheme 1 and Scheme 2-1 based on maximizing utilization/reuse of existing NR signaling methods are proposed. In the present disclosure, Scheme 1 corresponds to the same layer/port-based simultaneous transmission method, and is referred to as the SFN STxMP method for convenience of explanation. Additionally, in the present disclosure, Scheme 2-1 corresponds to a different layer/port-based simultaneous transmission method and is referred to as the SDM STxMP method for convenience of explanation.

Regarding PUSCH transmission in the methods proposed in the present disclosure, a case that codebook based (CB) PUSCH transmission and non-codebook based (non-CB, NCB) PUSCH transmission are supported for dynamic grant (DG) based PUSCH and configured grant (CG) based PUSCH is considered.

For CB PUSCH transmission/NCB PUSCH transmission, SRS resources for CB/NCB use need to be configured/transmitted. At this time, depending on the SRS transmission method, the following three methods may be considered.

(Method 1) The base station may configure/indicate a plurality of CB/NCB SRS resource sets (for time domain behavior) to support the SFN STxMP method/SDM STxMP method.

(Method 2) The base station may configure/indicate a single CB/NCB SRS resource set (for time domain behavior) to support the SFN STxMP method/SDM STxMP method. For this, a plurality of spatial parameters (e.g., spatial relation RS, or TCI state, etc.) may be configured/indicated in some or all of the SRS resource(s) of the corresponding SRS resource set.

(Method 3) Method 1 may be applied to one of the two methods, and Method 2 may be applied to the other method.

In the present disclosure, methods for distinguishing/indicating the SFN STxMP method and the SDM STxMP method for the above three methods will be proposed.

Embodiment 1

This embodiment is related to a method of indicating a specific method based on schedule signaling, etc., when a plurality of CB/NCB SRS resource sets are configured/indicated for both of the above-described two methods (SFN STxMP method and SDM STxMP method).

The corresponding embodiment may be related to method 1 among the three methods described above (i.e., method 1, method 2, and method 3). Method 1 may be a method of configuring and using a different SRS resource set for each activated panel applying STxMP. In this case, STxMP transmission (e.g., SDM STxMP method) may be applied to the corresponding SRS transmission, and for this, simultaneous transmission may be permitted for multiple SRS resources belonging to different sets (i.e., SRS resource sets).

In relation to method 1 described above, by applying a method of indicating multiple SRS resource indicators (SRI) (and a method of indicating multiple transmission PMI (TPMI)/transmission RI (TRI)) through a scheduling grant (e.g., UL DCI in the case of DG PUSCH) for CB PUSCH, CB SRS resource indication, which is beam information to be applied to each panel, may be possible. Additionally, precoder-related information for each panel (e.g., TPMI, TRI) may also be indicated. In addition, an extension method for NCB PUSCH to indicate multiple SRIs for multiple SRS resource sets shall be applied to indicate CB SRS resources and precoder to be applied for each panel. For this purpose, a method in which existing (e.g., Rel-15/16)

SRI fields are expanded into multiple numbers may be considered. However, in this case, ambiguity may arise as to which of the SFN STxMP method and the SDM STxMP method should be applied.

For example, the interpretation of TRI may vary depending on whether it is the SFN STxMP method or the SDM STxMP method. For example, in the case of SFN STxMP, TRI may be the same as the first TRI and the second TRI, and in the case of SDM STxMP, the TRI may be the sum of the first TRI and the second TRI. For reference, in the case of CB PUSCH, the first TRI and the second TRI may be joint encoded with the first TPMI and the second TPMI, respectively. Additionally, in the case of NCB PUSCH, the first TRI corresponds to the total number of SRS resources (or total number of ports) indicating the first SRS resource set, and the second TRI may correspond to the total number of SRS resources (or the total number of ports) indicating the second SRS resource set. In this case, to support panel-specific UL timing/power control, it may be desirable to map timing advance (TA) and/or UL power control-related parameters to each (CB/NCB) SRS resource set, or to a panel identifier (ID) associated with the corresponding SRS resource set.

In order to resolve the ambiguity as to which of the SFN STxMP method and the SDM STxMP method as described above shall be applied, the following methods are proposed.

As an example, one of the SFN STxMP method or the SDM STxMP method may be configured through RRC signaling and/or MAC-CE based signaling.

As another example, information (e.g., method indicator) that explicitly indicates one of the SFN STxMP method or the SDM STxMP method may be added to the scheduling DCI (e.g., DCI format 0_1/0_2).

As another example, a method of implicitly indicating one of the SFN STxMP method or the SDM STxMP method using the existing DCI field may be considered.

As a specific example, one method may be indicated through code division multiplexing (CDM) group information. If the indicated DMRS ports belong to the same CDM group, it is interpreted as an indication to apply the SFN STxMP method, and if the indicated DMRS ports belong to a plurality of CDM groups, it may be interpreted as an instruction to apply the SDM STxMP method by mapping each panel on a CDM group basis.

As another specific example, a new field related to M-TRP-based PUSCH repetitive transmission considered in Rel-17 NR standardization may be used. In Rel-17 NR standardization, with respect to M-TRP based PUSCH transmission, a new DCI field (e.g., SRS resource set indication field) is considered to distinguish between single-TRP (S-TRP) and multi-TRP (M-TRP) and to change the beam application order of M-TRP. However, in the case of the SFN STxMP method and the SDM STxMP method, separate instructions for dynamic beam application order may be unnecessary.

With regard to that specific example, the two code points (01, 11) defined for the new DCI field (for changing the order of M-TRP beam application) may be mapped to two methods (i.e., SFN STxMP method and SDM STxMP method) and used for the method indication purpose described above (Example 1). Additionally/alternatively, if only one of the two methods (e.g., SFN STxMP method, SDM STxMP method) is supported, or only one method is configured through certain signaling (e.g., RRC signaling, MAC-CE-based signaling), One code point (e.g. 01) may be used as is in the M-TRP-based PUSCH transmission method in the Rel-17 NR standard, and another code point (e.g., 11)

may be used as a dynamic indication for the SFN STxMP method or the SDM STxMP method instead of M-TRP-based beam switching (Example 2).

Additionally/alternatively, in addition to or in lieu of Examples 1 and 2 above, single panel transmission may be indicated through specific code points of the new DCI field along with the STxMP method (Example 3). As an example, code point 01 may mean one of the SFN STxMP method and SDM STxMP method, and code point 11 may mean transmission of only the second panel. Additionally, when single panel transmission is indicated, the UE may use only one specific SRI field (and TPMI/TRI field) and ignore the other field. As an example, when the M-TRP based transmission method in the Rel-17 NR standard is configured/indicated, if the code point (01) is indicated, the UE may be specified to ignore the second field among the plurality of SRI fields and use only the first field. On the other hand, when the STxMP method is configured/indicated and the code point (01) is indicated, the UE may be specified to ignore the first field among a plurality of SRI fields and use only the second field.

In addition to the problems described above, a plurality of SRI/TPMI/TRI may be additionally indicated for the M-TRP/S-TRP based PUSCH repetitive transmission method (in the Rel-17 NR standard). Therefore, a method of distinguishing between the M-TRP/S-TRP based PUSCH repetitive transmission method and the above-mentioned STxMP methods (e.g., SFN STxMP method, SDM STxMP method) may be necessary.

As the above classification method, if the repetition number is 1, it means the STxMP method, and if the number of repetitions exceeds 1, a method of defining/configuring it to mean the existing PUSCH repeated transmission method (i.e., the M-TRP/S-TRP based PUSCH repeated transmission method) may be considered. For example, if the number of repetitions is set to 1 in the start and length indicator value (SLIV) field (or, if there is no indication, the default value is assumed to be 1), it means the STxMP method, and otherwise, it may be specified/set to mean an M-TRP/S-TRP based PUSCH repetitive transmission method.

If the number of repetitions is fixed to 1 to indicate the STxMP method in the corresponding operation, simultaneous support of the STxMP method and the existing repetitive transmission method becomes impossible. Taking this into consideration, it may be efficient to use a SLIV table with different indications for the STxMP method and the existing repetitive transmission method. That is, the first SLIV table may be configured only with repetition number=1 and be used only for the STxMP method, and the second SLIV table has the number of repetitions configured to 2 or more and may be used in a single panel/S-TRP/M-TRP based PUSCH transmission method. In this case, if the method of using the new DCI field described above (e.g., Example 1, Example 2, Example 3) is applied, a combination of the number of repetitions and a new DCI field (i.e., a new field related to the M-TRP-based PUSCH repeated transmission described above) may be used. Accordingly, based on the combination, dynamic indication between the STxMP method and the existing repetitive transmission method may be possible.

Embodiment 2

This embodiment relates to a method of determining the STxMP method for PUSCH transmission based on the STxMP method applied to CB/NCB SRS.

The embodiment may be related to method 2 among the three methods described above (i.e., method 1, method 2, and method 3). Method 2 may be a method of applying the above-described STxMP method (i.e., SFN STxMP method or SDM STxMP method) to the CB/NCB-based SRS transmission itself, and determining the method applied to the CB/NCB-based PUSCH transmission according to the method applied to the corresponding SRS transmission. That is, to apply the SFN STxMP method (i.e., UL SFN transmission for all layers) to PUSCH, CB/NCB SRS may also be configured/defined to transmit in the SFN STxMP method (i.e., UL SFN transmission for the same port(s)). Additionally, to apply the SDM STxMP method (i.e., transmitting different layer groups on each panel) for PUSCH, CB/NCB SRS may also be set/defined to be transmitted in the SDM STxMP method (i.e., each channel transmits different port groups of the same SRS resource).

For the above-described operation, a plurality of beams/panel information may need to be configured for the same SRS resource (particularly in Frequency Range (FR) 2). For example, a plurality of spatial relationship information, UL global control parameters such as pathloss RS (e.g., PO, alpha, etc.), UL TCI, and/or panel ID may be configured/indicated in the same SRS resource. In the case of the SFN STxMP method, the plurality of values may be applied to all SRS ports belonging to the corresponding SRS resource, and in the case of the SDM STxMP method, each of the plurality of values may be applied to each SRS port group. As a result, the STxMP method for PUSCH transmission may be determined according to the STxMP method applied to the SRS resource indicated by the base station through SRI.

At this time, with regard to the SFN STxMP method, it may be desirable to indicate a single TPMI and a single TPI to be applied to the SFNed port for CB PUSCH transmission. In addition, for NCB PUSCH transmission, the same as the existing method (e.g. Rel-15/16 method), it may be desirable to indicate the SRI(s) for a single set (i.e., a single SRS resource set) to indicate the precoder and rank values.

Regarding the SDM STxMP method, for CB PUSCH transmission, both a method in which TPMI/TRI is indicated separately for each port group and/or a method in which a single TPMI/TRI is indicated for all ports may be applied. Alternatively, a hybrid method is possible in which TPMI is applied to each port group and TRI is applied to all ports. When indicating a single TPMI/TRI, since the precoder is applied to each panel by dividing it into submatrix units of the precoding matrix indicated by TPMI/TRI, some matrices (especially matrices for coherent transmission) defined in the TPMI codebook may be difficult to apply to UEs using multiple panels. Therefore, in this case, it may be defined/configured (through codebook subset restriction) to apply only partially coherent TPMI and/or non-coherent TPMI, excluding full coherent TPMI. Alternatively, the corresponding UE (e.g., a UE supporting the SDM STxMP method) may be specified to have/support only partial coherent TPMI and/or non-coherent TPMI.

Additionally, with regard to the SDM STxMP method, for NCB PUSCH transmission, a single SRS may be configured/defined to include multiple ports. For example, if the base station sets/instructs by expanding each NCB SRS resource to have 2 ports, the UE may transmit 2 ports belonging to each resource, 1 port at a time, through different panels. That is, the UE may simultaneously transmit NCB SRS by applying first spatial relation information (spatial relation #1) and second spatial relation information (spatial relation #2) to each port. Thereafter, when the base station indicates one or more SRI(s) through a PUSCH scheduling grant (i.e., UL DCI), the PUSCH precoder and rank may (finally) be determined according to the port combination transmitted in the corresponding SRS resource(s).

As a specific example, when a first SRI (SRI #0) with 2 ports and a second SRI (SRI #1) with 1 port are configured/indicated, and the first port of the first SRI and the port of the second SRI are transmitted from the first panel (panel #0), and the second port of the first SRI is transmitted from the second panel (panel #1), the UE may transmit the first and third layers of the PUSCH through the first panel, and transmit the second layer of the PUSCH through the second panel. Here, it is assumed that the port of the second SRI is transmitted in the first panel, but the port of the second SRI may be transmitted in the second panel, In this case, the UE may transmit the second and third layers of PUSCH through the second panel. Here, it may be stipulated that the UE determines implementation-wise which panel to transmit the port of the second panel through, but it may also be possible for the base station to specify (to the UE) the transmission panel information of each resource/port. In addition, for the first SRI, it was assumed that the first port was transmitted through the first panel and the second port was transmitted through the second panel, but, conversely, the first port may be transmitted through the second panel, and the second port may be transmitted through the first panel. Transmission SRS port information for each panel may be arbitrarily determined by the terminal, or may be configured/defined (to the UE) by the base station.

Alternatively, it may be stipulated that only the SFN STxMP method may be applied while maintaining that only a single port is set for NCB SRS.

In relation to method 2 described above, differences may occur in the CB/NCB-based SRS transmission method depending on whether it is the SFN STxMP method or the SDM STxMP method. For example, in the case of 2-port-based CB SRS transmission, there may be differences in the SRS transmission method depending on the SFN STxMP method or the SDM STxMP method. To solve this problem, a method may be needed for the UE to distinguish between SRS transmission methods, and the following methods are proposed.

As an example, a method of setting a method to be applied to SRS (i.e., STxMP method) through RRC signaling may be considered. Specifically, information on the method may be configured in an SRS resource or in an SRS resource set. When configuring information on that method in the SRS resource set, parameters related to the usage of the SRS resource set may be expanded to indicate whether it is the SFN STxMP method or the SDM STxMP method. (e.g., CB-SFN STxMP method, CB-SDM STxMP method, NCB-SFN STxMP method, NCB-SDM STxMP method). Additionally/alternatively, a method to be applied to all SRS resources may be configured. The corresponding configuration information and/or indication information (e.g., indicator) may also be applied to other UL channels/RS(s). The method in this example may be applied to some or all of periodic/semi-persistent (SP)/aperiodic (AP) SRS.

As another example, a method of setting/specifying a method to be applied to SRS (i.e., STxMP method) through an SRS activation/triggering message may be considered. STxMP scheme (and single panel transmission) may be indicated via SP SRS activating MAC-CE (in SP SRS case) or triggering DCI (in AP SRS case).

As another example, a method of indicating a method to be applied integratedly to CB/NCB SRS and CB/NCB PUSCH using unified TCI (i.e., unified TCI status information in Rel-17 NR standardization) may be considered. In other words, using MAC-CE/DCI to indicate/update the integrated TCI, common spatial relation information or common TCI state to be applied to CB/NCB SRS and CB/NCB PUSCH may be indicated. At this time, a plurality of common spatial relation information or TCI states may be indicated.

When a plurality of spatial relation information/TCI states are indicated for the integrated TCI, in addition to a common SR resource group/set to which the plurality of values are applied, an SRS resource group/set to which only one specific spatial relation/TCI state is applied may be separately defined/configured. For the corresponding SRS resources, since only a single spatial relation information/TCI state is applied to each SRS resource, the STxMP method of PUSCH can be supported through a method of indicating a plurality of SRS resources through a scheduling grant (i.e., method 1 described above) (i.e., both method 1 and method 2 described above are supported). Accordingly, the method in this example, when multiple integrated TCIs are indicated, it may be applied limitedly to SRS resource(s) included as a target channel/RS to be commonly applied in a plurality of TCI states.

Additionally, with regard to this example, the STxMP method indicated based on the unified TCI may be applied not only to the SRS and PUSCH described above, but also to all or part of other uplink channels/RSs. Here, the other uplink channels/RSs may correspond to uplink channels/RSs defined/configured to apply unified TCI. As a specific example, for PUCCH resources to which unified TCI is applied, if a common target channel/RS for multiple unified TCI states is configured/defined, the STxMP method for PUCCH resources may be applied. However, since the PUCCH resource includes only a single port, only the SFN STxMP method may be applied to the PUCCH resource to which multiple TCI states are applied. In this case, even if the SDM STxMP method is configured/indicated to be applied to the CB/NCB SRS and CB/NCB PUSCH using a plurality of TCI states, the SFN STxMP method may be applied to the PUCCH. Alternatively, it may be stipulated that single panel transmission is unconditionally applied to PUCCH (and other UL channels/RSs to which unified TCI is applied).

Even if the SFN STxMP method or the SDM STxMP method is configured/indicated to apply to CB/NCB SRS and CB/NCB PUSCH using a plurality of integrated TCI, only one specific TCI state among the plurality of TCI states (e.g., the first TCI state) may be defined/configured to be applied to all or some of the other UL channels/RSs (e.g. PUCCH) subject to the corresponding unified TCI.

In relation to the above-described example, when TA values and/or UL power control related parameters are configured to support panel-specific UL timing/power control, it may be desirable to configure the corresponding parameters by mapping them to each source RS (e.g., spatial relation information, TCI state).

Additionally, in relation to Method 2 described above, in the case of Method 2, since SRS resources with multiple spatial relation RS/TCI states shall be set/triggered separately from SRS resources with a single spatial relation RS/TCI state, burdens such as overhead for configuring/indicating resources and increased memory requirements may occur. For example, for M-TRP/S-TRP based PUSCH repetitive transmission (in the Rel-17 NR standard), two SRS resource sets with a single spatial relation shall be configured, and for the SFN STxMP method, two additional SRS resource sets with multiple spatial relation shall be configured.

In order to solve the problems such as the above-mentioned overhead and increased memory requirements, the following method is proposed.

For example, multiple SRS resource sets are configured while allowing SRS resources with single or multiple spatial relation/TCI states for the same SRS resource set to be mixed. Here, multiple SRS resource sets may be for the same usage and the same time domain behavior. At this time, the SRI(s) for each SRS resource set may be indicated through the UL grant (if there is a single SRS resource within the SRS resource set, the corresponding SRS resource may be indicated automatically), and if a plurality of spatial relation RS/TCI states are configured for the indicated SRS resource, it may be specified to use only the spatial relation RS/TCI state in a specific order. Here, two SRI fields may indicate the same SRS resource (for STxMP purposes). If the same SRS resource is indicated, it is interpreted to mean the STxMP method, and if different SRS resources are indicated, it may be interpreted to mean the existing M-TRP/S-TRP based repetitive transmission method (in the Rel-17 NR standard).

As a specific example, it is assumed that the first SRS resource set is set to {SRS 0, SRS 1, SRS 2, SRS 3}, and the second SRS resource set is set to {SRS 0, SRS 1, SRS 4, SRS 5}, and SRS 0 and SRS 1 each have two spatial relation information/TCI states set, and SRS 2, SRS 3, SRS 4, and SRS 5 have one spatial relation information/TCI state set. In this case, if SRS 0 is selected in both the first SRS resource set and the second SRS resource set, the UE may perform STxMP PUSCH transmission using the two spatial relation information/TCI states set in SRS 0. Since the same SRS was selected, STxMP PUSCH transmission may be performed.

Alternatively, if SRS 1 is selected from both the first SRS resource set and the second SRS resource set, the UE may perform STxMP PUSCH transmission using the two spatial relation information/TCI states set in SRS 1. Since the same SRS was selected, STxMP PUSCH transmission may be performed. Alternatively, when SRS 0 is selected from the first SRS resource set and SRS 1 is selected from the second SRS resource set, the UE may perform existing M-TRP-based PUSCH transmission (in the Rel-17 NR standard) using the first spatial relation information/TCI state of SRS 0 and the second spatial relation information/TCI state of SRS 1. Alternatively, when SRS 0 is selected from the first SRS resource set and SRS 4 is selected from the second SRS resource set, the UE may perform existing M-TRP-based PUSCH transmission (in the Rel-17 NR standard) using the first spatial relation information/TCI state of SRS 0 and the spatial relation information/TCI state of SRS 4. Since a different SRS has been selected, existing M-TRP based PUSCH transmission (in Rel-17 NR standard) may be performed.

Additionally, as explained in the above example, through the proposed method, dynamic switching between the existing M-TRP-based PUSCH transmission method (in the Rel-17 NR standard) and the SDM STxMP method may be possible with only two SRS resource sets.

Embodiment 3

This embodiment is related to a method for distinguishing between two STxMP methods (i.e., SFN STxMP method and SDM STxMP method) according to CB/NCB SRS resource configuration.

This embodiment may be related to method 3 among the three methods described above (i.e., method 1, method 2, and method 3). Method 3 is a method of applying Method 1 and Method 2 to one STxMP method each. As an example, it may be specified that method 1 is applied to the SFN STxMP method and method 2 is applied to the SDM STxMP method. The opposite case is also possible. In case of method 3, the STxMP method of PUSCH transmission may be classified according to the method applied to SRS transmission, that is, method 1 or method 2.

For example, it may be assumed that the SFN STxMP scheme is supported through a SFNed SRS (i.e., an SRS based on a single SRS resource set with multiple spatial relations/TCI states) by applying Scheme 2 described above, and it may be assumed that the SDM STxMP method is supported through a plurality of SRS resources or SRS resource sets by applying method 1 described above. In this case, scheme selection for CB PUSCH may be performed as described below.

If a single SRI is indicated through a UL grant, and the SRI corresponds to a single spatial relation, the UE may be configured/defined to perform PUSCH transmission by applying the existing S-TRP-based transmission method. Alternatively, if a single SRI is indicated through a UL grant and the SRI corresponds to a multi-spatial relation, the UE may be configured/defined to perform PUSCH transmission by applying the SFN STxMP method.

Alternatively, if multiple SRIs are indicated through a UL grant, the UE may be configured/defined to perform PUSCH transmission by applying the SDM STxMP method. Here, M-TRP-based PUSCH repetitive transmission methods and STxMP methods may be configured/defined to be distinguished based on information on the number of repetitions.

Similarly, in the case of NCB PUSCH, "existing S-TRP-based transmission method or SFN STxMP method" and "SDM STxMP method" may be set/defined to differentiate depending on whether it indicates SRI(s) within a single SRS resource set, or SRI(s) for multiple SRS resource sets. Additionally, depending on whether there is one spatial relation (or TCI) established in the indicated SRI(s) or multiple, the existing S-TRP-based transmission method and the SFN STxMP method may be configured/defined to apply the existing S-TRP-based transmission method in the case of one transmission method, and apply the SFN STxMP method in the case of multiple transmission methods.

The SRS transmission method based on the SFN STxMP method and/or the SDM STxMP method described for method 1, method 2, and method 3 described above through embodiments of the present disclosure may include not only CB/NCB SRS, but also may be extended and applied to SRS resource(s) for other purposes (e.g., beam management (BM), antenna selection, and positioning). That is, for the corresponding SRS resource(s), simultaneous multi-panel transmission (i.e., multi-panel based simultaneous transmission, STxMP) may be possible according to configuration/indication related to the SFN STxMP method and/or the SDM STxMP method.

Figure 8:
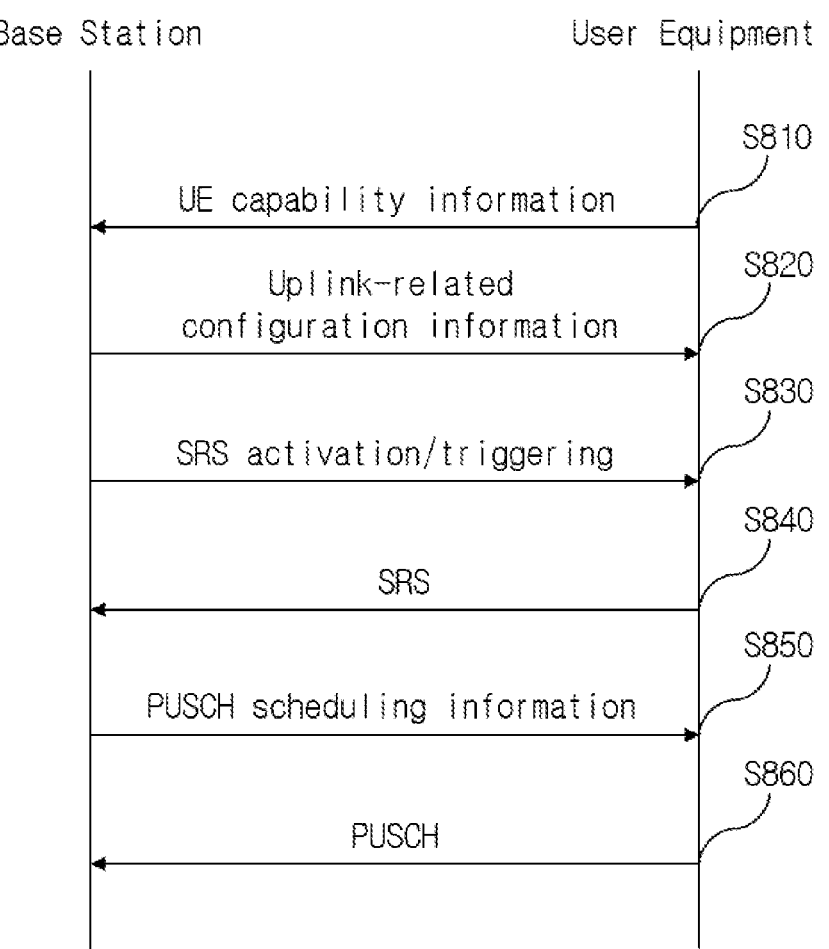
FIG. 8 illustrates signaling between a base station and a UE for an uplink transmission/reception method in a wireless communication system to which the present disclosure may be applied.

FIG. 8 illustrates signaling between a base station and a UE for an uplink transmission and reception method in a wireless communication system to which the present disclosure may be applied.

Figure 11:
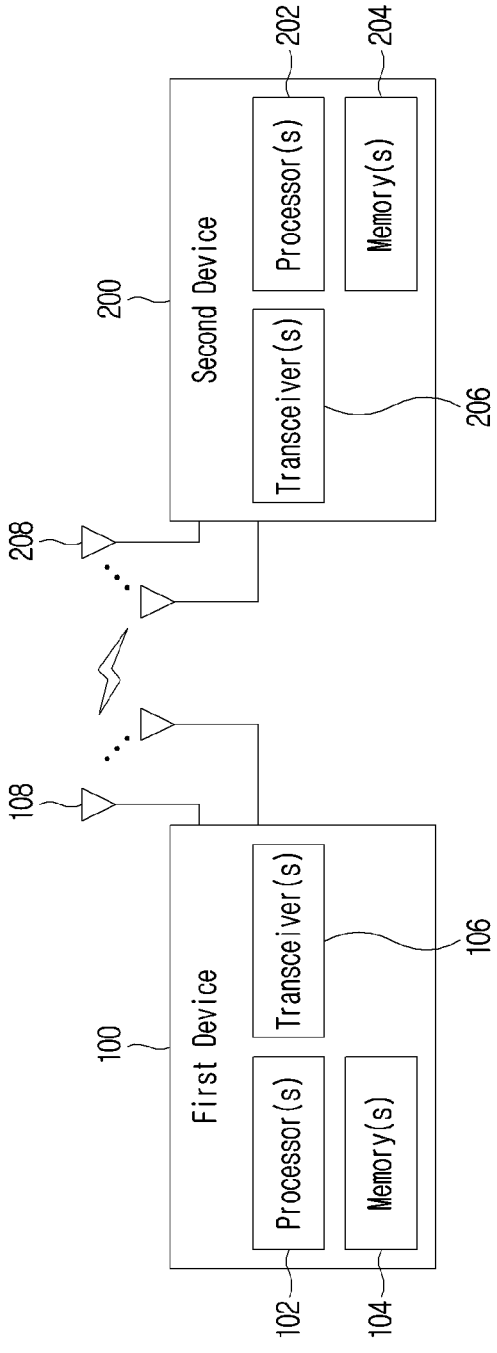
FIG. 11 is a diagram which illustrates a block diagram of a wireless communication device according to an embodiment of the present disclosure.

FIG. 8 is an example of signaling between a base station and a UE based on methods proposed in the above-described embodiments (e.g., Embodiment 1, Embodiment 2, Embodiment 3, and detailed embodiments). Here, the base station/UE is only an example, and may be replaced with various devices as shown in FIG. 11 described later. FIG. 8 is merely for convenience of explanation and does not limit the scope of the present invention. Additionally, some step(s) shown in FIG. 8 may be omitted depending on the situation and/or settings.

It is assumed that the base station and/or UE in FIG. 8 supports multi-panel transmission/reception. Additionally, the panel may be a unit consisting of one or a plurality of antenna(s), antenna port(s), beam(s), and uplink/downlink channel/RS resource(s) of the UE. As an example, an uplink transmission panel may be identified based on the source RS (e.g., TCI state, spatial relation information) for the uplink channel/RS, and specifically, it may be identified as a unit having a specific uplink/downlink resource set/group (ID) or a specific (panel-related) ID as the source RS.

Referring to FIG. 8, in step S810, the UE may report UE capability information to the base station. The UE capability information may include UE capability information related to the panel.

As an example, the UE capability information may include the maximum number of panels configurable to a UE, the maximum number of panels that a UE may activate simultaneously, information on whether uplink multi-panel simultaneous transmission may be performed (for a specific uplink channel/RS), information on supported simultaneous transmission methods (for a specific uplink channel/RS) (e.g., whether STxMP method 1/2-1/2-2 is supported, i.e., whether SFN STxMP method/SDM STxMP method is supported), or the like. In this regard, the UE may report UE capability information related to the proposed methods in the above-described embodiments (e.g., method 1, method 2, method 3, and solutions to related problems) to the base station. For example, the UE may report to the base station whether the above-described method 1/method 2/method 3 is supported, whether the solution to the above-mentioned problems is supported, etc. as UE capability information.

In step S820, the UE may receive configuration information related to uplink transmission from the base station. As an example, the configuration information may include panel-related configuration information for uplink transmission of the terminal. As a specific example, panel-related configuration information may include a configuration for uplink transmission such as PUCCH, PUSCH, SRS, PRACH, etc. In particular, with regard to the above-described embodiments (e.g., Embodiment 1, Embodiment 2, Embodiment 3, and Detailed Embodiments), the configuration information may include a configuration related to application of Method 1/Method 2/Method 3, configuration information related to CB/NCB SRS resources (set), and PUSCH-related configuration information. Additionally, configuration information for the STxMP method that may be applied to PUSCH and/or SRS (based on the UE report in step S810) may be included.

The configuration information may be configured through an RRC message, MAC-CE message, and/or DCI. The corresponding configuration information may be configured in the form of an existing information element (IE) and/or an existing field (e.g., SRI, etc.), or may be configured in the form of a newly defined IE and/or a newly defined field. In addition, through unified TCI-related configuration/indication, beam and uplink power control-related information to be applied to PUCCH/PUSCH/SRS, etc. may be configured.

At step S830, for aperiodic SRS or semi-periodic SRS, the base station may deliver the SRS activation/triggering message to the UE through MAC-CE or DCI.

In step S840, the UE receiving the message may transmit an SRS to the base station based on related configuration/indication information (e.g., information in step S820 and/or step 830). As an example, SRS-related configuration information and/or SRS activation/triggering messages may include information on the transmission method to be applied to SRS transmission (e.g., information on whether to apply STxMP transmission and/or which STxMP method to apply), and/or (in the case of CB/NCB SRS) information on the PUSCH transmission method associated with the SRS (e.g., whether method 1/method 2/method 3 is applicable, etc.), or the like.

In step S850, the base station may transmit scheduling information for the PUSCH to the terminal through DCI, etc. The scheduling information may include time/frequency resource allocation information for PUSCH, beam/panel/precoder information to be applied to PUSCH (e.g., SRI(s), TRI(s), TPMI(s)), uplink MCS information, etc. Additionally, the corresponding scheduling information may include transmission method (STxMP-related) to be applied to PUSCH and/or beam/panel/precoder-related information as an explicit or implicit indicator. For example, when Method 1 is applied as in Embodiment 1, a plurality of SRI fields may be indicated and included in the corresponding scheduling information. At this time, the methods proposed in Embodiment 1 described above may be used as a method for distinguishing between the SFN STxMP method and the SDM STxMP method. As another example, when method 2 is applied as in Embodiment 2, a single SRI field may be indicated and included in the corresponding scheduling information. At this time, like the proposed methods in Embodiment 2 described above, the PUSCH transmission method may be determined according to the transmission method applied to the SRI resource(s) indicated through the SRI field.

In step S860, the UE that has received the scheduling information may transmit a PUSCH to the base station based on related configuration/indication information (e.g., information in step S820, step S830, and/or step S850).

As mentioned above, the signaling and operation between base stations/UE described above (e.g., Embodiment 1, Embodiment 2, Embodiment 3 and detailed embodiments, and the description in FIG. 8) may be implemented by a device to be described below (e.g., FIG. 11). For example, a base station (e.g., TRP 1/TRP 2) may correspond to a first wireless device, and the UE may correspond to a second wireless device, and vice versa may be considered in some cases.

For example, the signaling and operation between base stations/UE described above (e.g., Embodiment 1, Embodiment 2, Embodiment 3 and detailed embodiments, and the description in FIG. 8) may be processed by one or more processors (eg, 102, 202) of FIG. 11. In addition, the signaling and operation between base station/UE described above (e.g., Embodiment 1, Embodiment 2, Embodiment 3 and detailed embodiments, and the description in FIG. 8) may be stored in one or more memories (e.g., 104, 204) of FIG. 11 in the form of instructions/programs (e.g., instructions, executable code, etc.) for driving at least one processor (e.g., 102, 202) of FIG. 11.

Figure 9:
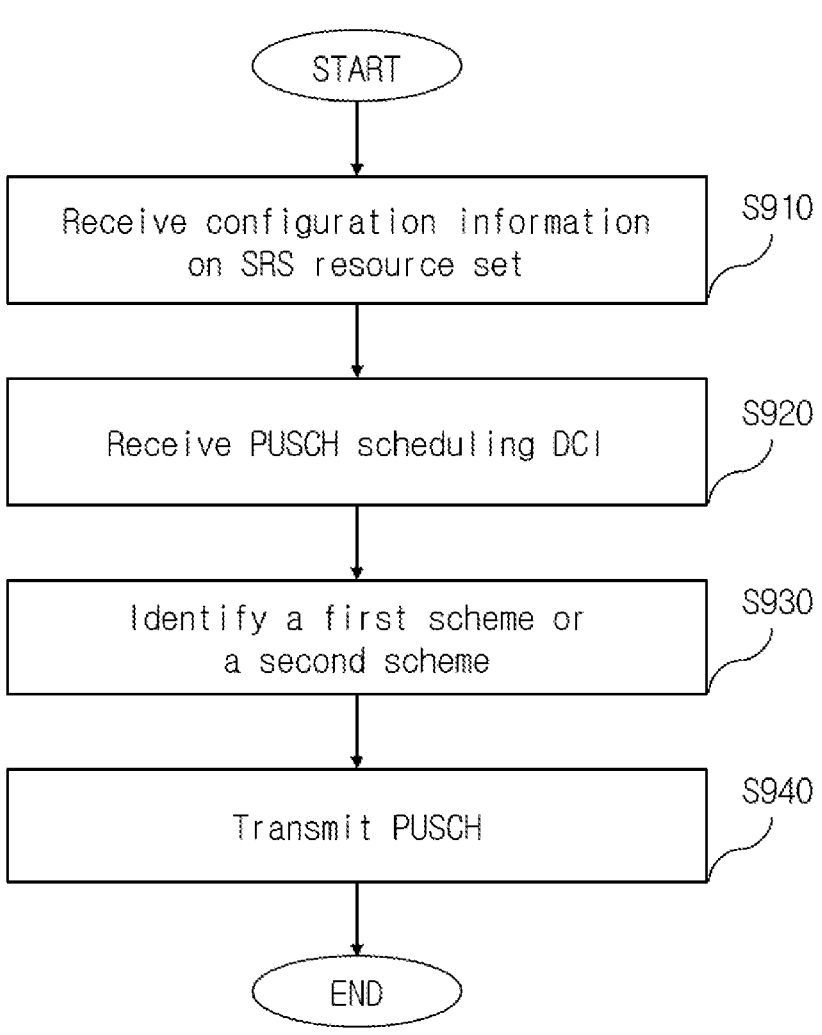
FIG. 9 is a diagram illustrating an operation of a UE for an uplink transmission/reception method according to an embodiment of the present disclosure.

FIG. 9 is a diagram illustrating an operation of a UE in a method for performing uplink transmission and reception according to an embodiment of the present disclosure.

FIG. 9 illustrates an operation of operation of a UE based on the previously proposed method (e.g., any one or a combination of Embodiment 1, Embodiment 2, Embodiment 3 and detailed embodiments thereof). The example of FIG. 9 is for convenience of description, and does not limit the scope of the present disclosure. Some step(s) illustrated in FIG. 9 may be omitted depending on circumstances and/or configuration. In addition, the UE in FIG. 9 is only one example, and may be implemented as the apparatus illustrated in FIG. 11 below. For example, the processor 102/202 of FIG. 11 may control to transmit and receive channel/signal/data/information, or the like using the transceiver 106/206, and may control to store channel/signal/data/information to be transmitted or received in the memory 104/204.

Also, the operation of FIG. 9 may be processed by one or more processors (102, 202) in FIG. 11, and the operation of FIG. 9 may be stored in a memory (e.g., one or more memories (104, 204) in FIG. 11, in the form of instructions/programs (e.g., instructions, executable code) for driving at least one processor (102, 202) in FIG. 11.

Referring to FIG. 9, in step S910, the UE may receive configuration information on the SRS resource set from a base station (e.g., a base station configured with at least one TRP, etc.). Here, the corresponding configuration information may include configurations for one or more SRS resource sets.

For example, like the proposed method in the above-described embodiments (e.g., Embodiment 1, Embodiment 2, and Embodiment 3), the configuration information may include a configuration for the SRS resource set(s) to be configured for the UE in relation to SRS transmission and reception, spatial parameter configurations for PUSCH transmission and reception, STxMP method application, etc.

In step S920, the UE may receive a DCI (e.g., UL DCI) scheduling PUSCH from the base station. Here, the corresponding DCI may include information related to at least one SRS resource set among the one or more SRS resource sets.

For example, like the proposed method in the above-described embodiments (e.g., Embodiment 1, Embodiment 2, and Embodiment 3), the DCI may include information on SRI(s)/TPMI(s)/TRI(s). Here, when multiple SRIs are indicated, the SRIs may indicate SRS resources belonging to a single SRS resource set, or may indicate SRS resources belonging to multiple SRS resource sets. Alternatively, the DCI may include information indicating the SRS resource set itself (e.g., SRS resource set indicator field, a new field introduced in relation to the above-described M-TRP-based PUSCH repetitive transmission).

At step S930, the UE may identify either the first method or the second method as the multi-spatial parameter based simultaneous transmission method (i.e., STxMP method) to be applied to the PUSCH. Here, the first method corresponds to the same layer/port-based transmission method (e.g., the SFN STxMP method described above), and the second method may correspond to a different layer/port-based transmission method (e.g., SDM STxMP method).

At this time, like the method proposed in the above-described embodiments (e.g., Embodiment 1, Embodiment 2, and Embodiment 3), the UE may identify either the first method or the second method to be applied to PUSCH, based on at least one of i) the number of at least one SRS resource set indicated by the DCI or ii) information related to one of the first method or the second method (i.e., information explicitly/implicitly indicating/representing either the first method or the second method).

For example, when two or more SRS resource sets are indicated through the DCI, information related to either the first method or the second method described above may be transmitted through at least one of RRC signaling, MAC-CE, or DCI.

In this regard, as a specific example, the DCI may include an indicator (i.e., explicit method indication information) indicating one of the first method or the second method.

As another specific example, either the first method or the second method may be indicated based on whether at least one DMRS port indicated by the DCI belongs to the same CDM group. That is, the STxMP method to be applied to the PUSCH may be identified/determined depending on whether the DMRS port(s) indicated by DCI belong to the same CDM group or to multiple CDM groups. As an example, when the at least one DMRS port belongs to multiple CDM groups, the PUSCH is transmitted based on the second method, multiple spatial parameters (e.g., panels) applied to transmission of the corresponding PUSCH may be mapped one-to-one with multiple CDM groups (i.e., the UE's panel may be mapped on a CMR group basis).

As another specific example, the DCI may include a field related to PUSCH repeated transmission based on multiple spatial parameters (e.g., a new field introduced for M-TRP-based PUSCH repeated transmission in Embodiment 1 described above), and either the first method or the second method may be indicated based on at least one specific codepoint (e.g., codepoint (10), (11)) defined for the field. Here, at least one specific codepoint may be related to a change in the application order of spatial parameters (e.g., beams) for the PUSCH repeated transmission (e.g., M-TRP beam application order). At this time, one of the at least one specific codepoint may be used to indicate the application of a single spatial parameter-based transmission (e.g., single panel-based transmission).

Additionally, as in the above-described embodiments (e.g., Embodiment 1 and detailed embodiments), when multiple SRIs/TPMIs/TRIs are indicated by the corresponding DCI, whether to apply the above-described multi-spatial parameter-based simultaneous transmission (e.g., STxMP method) may be determined depending on the repetition number value related to PUSCH transmission.

Additionally, as in the above-described embodiments (e.g., Embodiment 3 and detailed examples), if a single SRS resource set is indicated through the corresponding DCI, the first method is applied to PUSCH transmission, and if two or more SRS resource sets are indicated through the corresponding DCI, the second method may be applied to PUSCH transmission.

In step S940, the UE may transmit an STxMP-based PUSCH to the base station based on the identified first or second method.

Figure 10:
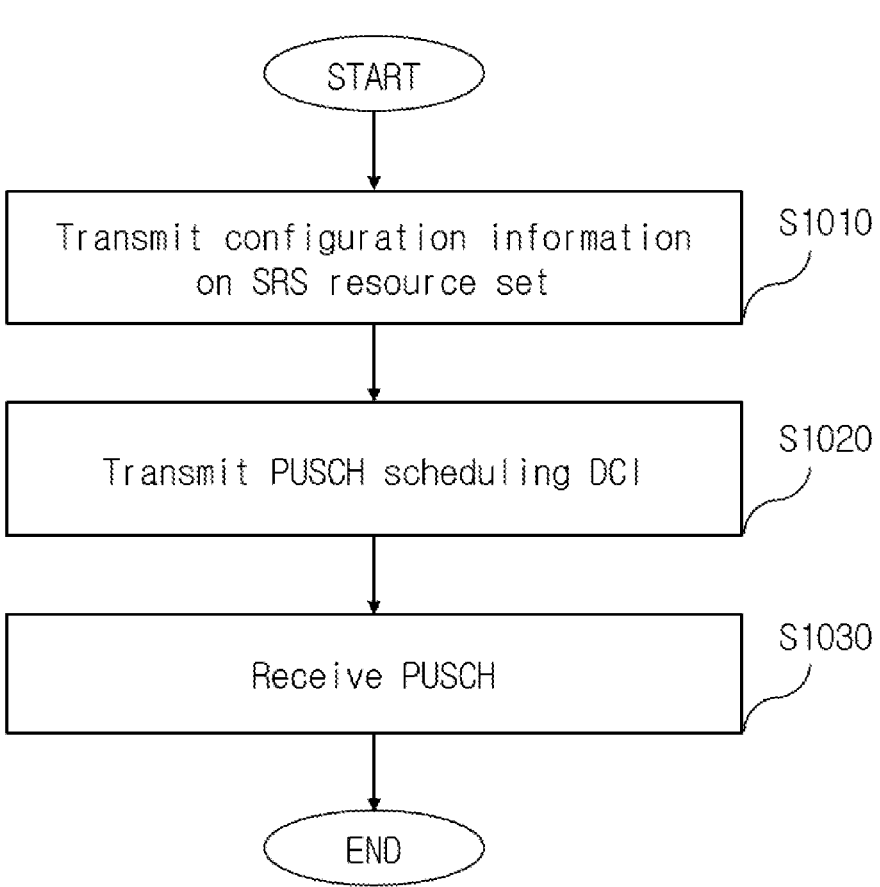
FIG. 10 is a diagram illustrating an operation of a base station for an uplink transmission/reception method according to an embodiment of the present disclosure.

FIG. 10 is a diagram illustrating an operation of a base station in a method for performing uplink transmission and reception according to an embodiment of the present disclosure.

FIG. 10 illustrates an operation of operation of a base station based on the previously proposed method (e.g., any one or a combination of Embodiment 1, Embodiment 2, Embodiment 3 and detailed embodiments thereof). The example of FIG. 10 is for convenience of description, and does not limit the scope of the present disclosure. Some step(s) illustrated in FIG. 10 may be omitted depending on circumstances and/or configuration. In addition, the base station in FIG. 10 is only one example, and may be implemented as the apparatus illustrated in FIG. 11 below. For example, the processor 102/202 of FIG. 11 may control to transmit and receive channel/signal/data/information, or the like using the transceiver 106/206, and may control to store channel/signal/data/information to be transmitted or received in the memory 104/204.

Also, the operation of FIG. 10 may be processed by one or more processors (102, 202) in FIG. 11, and the operation of FIG. 10 may be stored in a memory (e.g., one or more memories (104, 204) in FIG. 11, in the form of instructions/programs (e.g., instructions, executable code) for driving at least one processor (102, 202) in FIG. 11.

Referring to FIG. 10, in step S1010, the base station (e.g., a base station configured with at least one TRP, etc.) may transmit configuration information on the SRS resource set to a UE. Here, the corresponding configuration information may include configurations for one or more SRS resource sets.

For example, like the proposed method in the above-described embodiments (e.g., Embodiment 1, Embodiment 2, and Embodiment 3), the configuration information may include a configuration for the SRS resource set(s) to be configured for the UE in relation to SRS transmission and reception, spatial parameter configurations for PUSCH transmission and reception, STxMP method application, etc.

In step S1020, the base station may transmit a DCI (e.g., UL DCI) scheduling PUSCH to the UE. Here, the corresponding DCI may include information related to at least one SRS resource set among the one or more SRS resource sets.

For example, like the proposed method in the above-described embodiments (e.g., Embodiment 1, Embodiment 2, and Embodiment 3), the DCI may include information on SRI(s)/TPMI(s)/TRI(s). Here, when multiple SRIs are indicated, the SRIs may indicate SRS resources belonging to a single SRS resource set, or may indicate SRS resources belonging to multiple SRS resource sets. Alternatively, the DCI may include information indicating the SRS resource set itself (e.g., SRS resource set indicator field, a new field introduced in relation to the above-described M-TRP-based PUSCH repetitive transmission).

In this regard, like the proposed method in the above-described embodiments (e.g., Embodiment 1, Embodiment 2, and Embodiment 3), either the first method or the second method may be configured/indicated to the UE, as a multi-spatial parameter based simultaneous transmission method (i.e., STxMP method) to be applied to PUSCH.

Here, the first method corresponds to the same layer/port-based transmission method (e.g., the SFN STxMP method described above), and the second method may correspond to a different layer/port-based transmission method (e.g., SDM STxMP method).

At this time, like the method proposed in the above-described embodiments (e.g., Embodiment 1, Embodiment 2, and Embodiment 3), the UE may identify either the first method or the second method to be applied to PUSCH, based on at least one of i) the number of at least one SRS resource set indicated by the DCI or ii) information related to one of the first method or the second method (i.e., information explicitly/implicitly indicating/representing either the first method or the second method).

For example, when two or more SRS resource sets are indicated through the DCI, information related to either the first method or the second method described above may be transmitted through at least one of RRC signaling, MAC-CE, or DCI.

In this regard, as a specific example, the DCI may include an indicator (i.e., explicit method indication information) indicating one of the first method or the second method.

As another specific example, either the first method or the second method may be indicated based on whether at least one DMRS port indicated by the DCI belongs to the same CDM group. That is, the STxMP method to be applied to the PUSCH may be identified/determined depending on whether the DMRS port(s) indicated by DCI belong to the same CDM group or to multiple CDM groups. As an example, when the at least one DMRS port belongs to multiple CDM groups, the PUSCH is transmitted based on the second method, multiple spatial parameters (e.g., panels) applied to transmission of the corresponding PUSCH may be mapped one-to-one with multiple CDM groups (i.e., the UE's panel may be mapped on a CMR group basis).

As another specific example, the DCI may include a field related to PUSCH repeated transmission based on multiple spatial parameters (e.g., a new field introduced for M-TRP-based PUSCH repeated transmission in Embodiment 1 described above), and either the first method or the second method may be indicated based on at least one specific codepoint (e.g., codepoint (10), (11)) defined for the field. Here, at least one specific codepoint may be related to a change in the application order of spatial parameters (e.g., beams) for the PUSCH repeated transmission (e.g., M-TRP beam application order). At this time, one of the at least one specific codepoint may be used to indicate the application of single spatial parameter-based transmission (e.g., single panel-based transmission).

Additionally, as in the above-described embodiments (e.g., Embodiment 1 and detailed embodiments), when multiple SRIs/TPMIs/TRIs are indicated by the corresponding DCI, whether to apply the above-described multi-spatial parameter-based simultaneous transmission (e.g., STxMP method) may be determined depending on the repetition number value related to PUSCH transmission.

Additionally, as in the above-described embodiments (e.g., Embodiment 3 and detailed examples), if a single SRS resource set is indicated through the corresponding DCI, the first method is applied to PUSCH transmission, and if two or more SRS resource sets are indicated through the corresponding DCI, the second method may be applied to PUSCH transmission.

In step S1030, the base station may receive a PUSCH based on the first method or the second method as the STxMP method from the UE.

General Device to which the Present Disclosure May be Applied

FIG. 13 illustrates a block diagram of a wireless communication device according to an embodiment of the present disclosure.

In reference to FIG. 13, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other nonvolatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL APPLICABILITY

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method for performing uplink transmission by a user equipment (UE) in a wireless communication system, the method comprising:

receiving, from a base station, configuration information for one or more sounding reference signal (SRS) resource sets;

receiving, from the base station, downlink control information (DCI) for scheduling a physical uplink shared channel (PUSCH), the DCI including information related to at least one SRS resource set among the one or more SRS resource sets;

based on at least one of a number of at least one SRS resource set or information related to one of a first scheme or a second scheme for multi-spatial parameter based simultaneous transmission, identifying a scheme to be applied to the PUSCH from among the first scheme or the second scheme; and transmitting the PUSCH to the base station based on the identified scheme, wherein the first scheme corresponds to the same layer based transmission scheme, and the second scheme corresponds to a different layer based transmission scheme.

2. The method of claim 1, wherein, based on two or more SRS resource sets being indicated through the DCI, the information related to one of the first scheme or the second scheme is delivered through at least one of radio resource control (RRC) signaling, medium access control-control element (MAC-CE), the DCI.

3. The method of claim 2, wherein the DCI includes an indicator indicating one of the first scheme or the second scheme.

4. The method of claim 2, wherein one of the first scheme or the second scheme is indicated based on whether at least one demodulation reference signal (DMRS) port indicated by the DCI belongs to the same code division multiplexing (CDM) group.

5. The method of claim 4, wherein the PUSCH is transmitted based on the second scheme based on the at least one DMRS port belonging to a plurality of CDM groups, and wherein a plurality of spatial parameters applied to transmission of the PUSCH are mapped one-to-one with the plurality of CDM groups.

6. The method of claim 2, wherein the DCI includes a field related to PUSCH repetition transmission based on multiple spatial parameters, and wherein one of the first scheme or the second scheme is indicated based on at least one specific codepoint defined for the field.

7. The method of claim 6, wherein the at least one specific codepoint is related to a switch in the application order of spatial parameters for the PUSCH repetition transmission.

8. The method of claim 7, wherein one of the at least one specific codepoint is used to indicate a single spatial parameter based transmission.

9. The method of claim 1, wherein, based on a plurality of SRS resource indicators being indicated by the DCI, whether to apply the multi-spatial parameter-based simultaneous transmission is determined according to a repetition number value related to PUSCH transmission.

10. The method of claim 1, wherein, based on a single SRS resource set indicated through the DCI, the first scheme is applied to transmission of the PUSCH, and wherein, based on two or more SRS resource sets indicated through the DCI, the second scheme is applied to transmission of the PUSCH.

11. A user equipment (UE) for performing uplink transmission in a wireless communication system, the UE comprising:

at least one transceiver; and at least one processor coupled with the at least one transceiver, wherein the at least one processor is configured to:

receive, from a base station, configuration information for one or more sounding reference signal (SRS) resource sets;

receive, from the base station, downlink control information (DCI) for scheduling a physical uplink shared channel (PUSCH), the DCI including information related to at least one SRS resource set among the one or more SRS resource sets;

based on at least one of a number of at least one SRS resource set or information related to one of a first scheme or a second scheme for multi-spatial parameter based simultaneous transmission, identify a scheme to be applied to the PUSCH from among the first scheme or the second scheme; and transmit the PUSCH to the base station based on the identified scheme, wherein the first scheme corresponds to the same layer based transmission scheme, and the second scheme corresponds to a different layer based transmission scheme.

12. A base station for performing uplink reception in a wireless communication system, the base station comprising:

at least one transceiver; and at least one processor coupled with the at least one transceiver, wherein the at least one processor is configured to:

transmit, to a user equipment (UE), configuration information for one or more sounding reference signal (SRS) resource sets;

transmit, to the UE, downlink control information (DCI) for scheduling a physical uplink shared channel (PUSCH), the DCI including information related to at least one SRS resource set among the one or more SRS resource sets; and receive, from the UE, a PUSCH based on a first scheme or a second scheme for multi-spatial parameter based simultaneous transmission, wherein one of the first scheme or the second scheme applied to the PUSCH is indicated based on at least one of a number of the at least one SRS resource set or information related to one of the first scheme or the second scheme, and wherein the first scheme corresponds to the same layer based transmission scheme, and the second scheme corresponds to a different layer based transmission scheme.

* * * * *